United States Patent
Mizobuchi et al.

(10) Patent No.: US 9,921,947 B2
(45) Date of Patent: Mar. 20, 2018

(54) TEST SELECTION METHOD AND TEST SELECTION APPARATUS

(71) Applicant: FUJITSU LIMITED, Kawasaki-shi, Kanagawa (JP)

(72) Inventors: Yuji Mizobuchi, Kawasaki (JP); Kuniharu Takayama, Tama (JP); Satoshi Munakata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 215 days.

(21) Appl. No.: 14/959,713

(22) Filed: Dec. 4, 2015

(65) Prior Publication Data

US 2016/0196200 A1 Jul. 7, 2016

(30) Foreign Application Priority Data

Jan. 5, 2015 (JP) ................................ 2015-000170

(51) Int. Cl.
*G06F 9/44* (2006.01)
*G06F 11/36* (2006.01)

(52) U.S. Cl.
CPC ........ *G06F 11/368* (2013.01); *G06F 11/3684* (2013.01)

(58) Field of Classification Search
None
See application file for complete search history.

(56) References Cited

U.S. PATENT DOCUMENTS

| 6,182,245 | B1 * | 1/2001 | Akin | G06F 11/3672 711/100 |
| 9,003,368 | B2 * | 4/2015 | Kim | G06F 11/3684 717/124 |
| 2007/0300208 | A1 * | 12/2007 | Furukawa | G06F 11/3672 717/127 |
| 2008/0148247 | A1 * | 6/2008 | Galler | G06F 11/3684 717/154 |

(Continued)

FOREIGN PATENT DOCUMENTS

| JP | 2005-332098 | 12/2005 |
| JP | 2008-003985 | 1/2008 |

(Continued)

OTHER PUBLICATIONS

Zimmermann, "Predicting Subsystem Failures using Dependency Graph Complexities", 2007 IEEE, 18th IEEE International Symposium on Software Reliability Engineering.*

*Primary Examiner* — Hossain Morshed
(74) *Attorney, Agent, or Firm* — Fujitsu Patent Center

(57) ABSTRACT

A test selection method includes: generating, by a computer, relationship information that includes information indicating whether there is a relationship between each pair of one of a plurality of first tests and one of a plurality of second tests, and information on the number of relationships that indicates the number of pairs having the relationship from among a plurality of the pairs, by use of a result of performing the plurality of first tests and a result of performing the plurality of second tests; and when a specific test included in the plurality of first tests is designated, extracting (Continued)

by the computer, from among the plurality of second tests, a related test that relates to the specific test, on the basis of the relationship information and the information on the number of relationships.

7 Claims, 26 Drawing Sheets

(56) References Cited

U.S. PATENT DOCUMENTS

| | | | | |
|---|---|---|---|---|
| 2008/0163003 | A1* | 7/2008 | Mehrotra | G06F 11/3684 |
| | | | | 714/38.1 |
| 2008/0256392 | A1* | 10/2008 | Garland | G06F 11/263 |
| | | | | 714/33 |
| 2009/0222697 | A1* | 9/2009 | Thakkar | G06F 11/3676 |
| | | | | 714/38.1 |
| 2012/0117545 | A1* | 5/2012 | Yokoi | G06F 11/3624 |
| | | | | 717/126 |
| 2016/0196200 | A1* | 7/2016 | Mizobuchi | G06F 11/368 |
| | | | | 717/124 |

FOREIGN PATENT DOCUMENTS

| | | |
|---|---|---|
| JP | 2009-252167 | 10/2009 |
| JP | 2013-142967 | 7/2013 |

\* cited by examiner

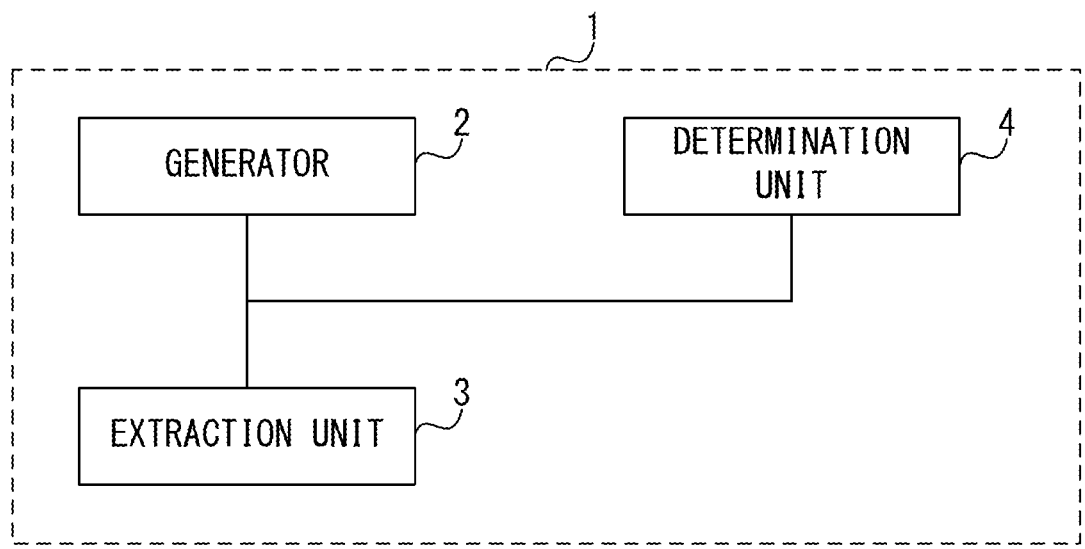
F I G. 1

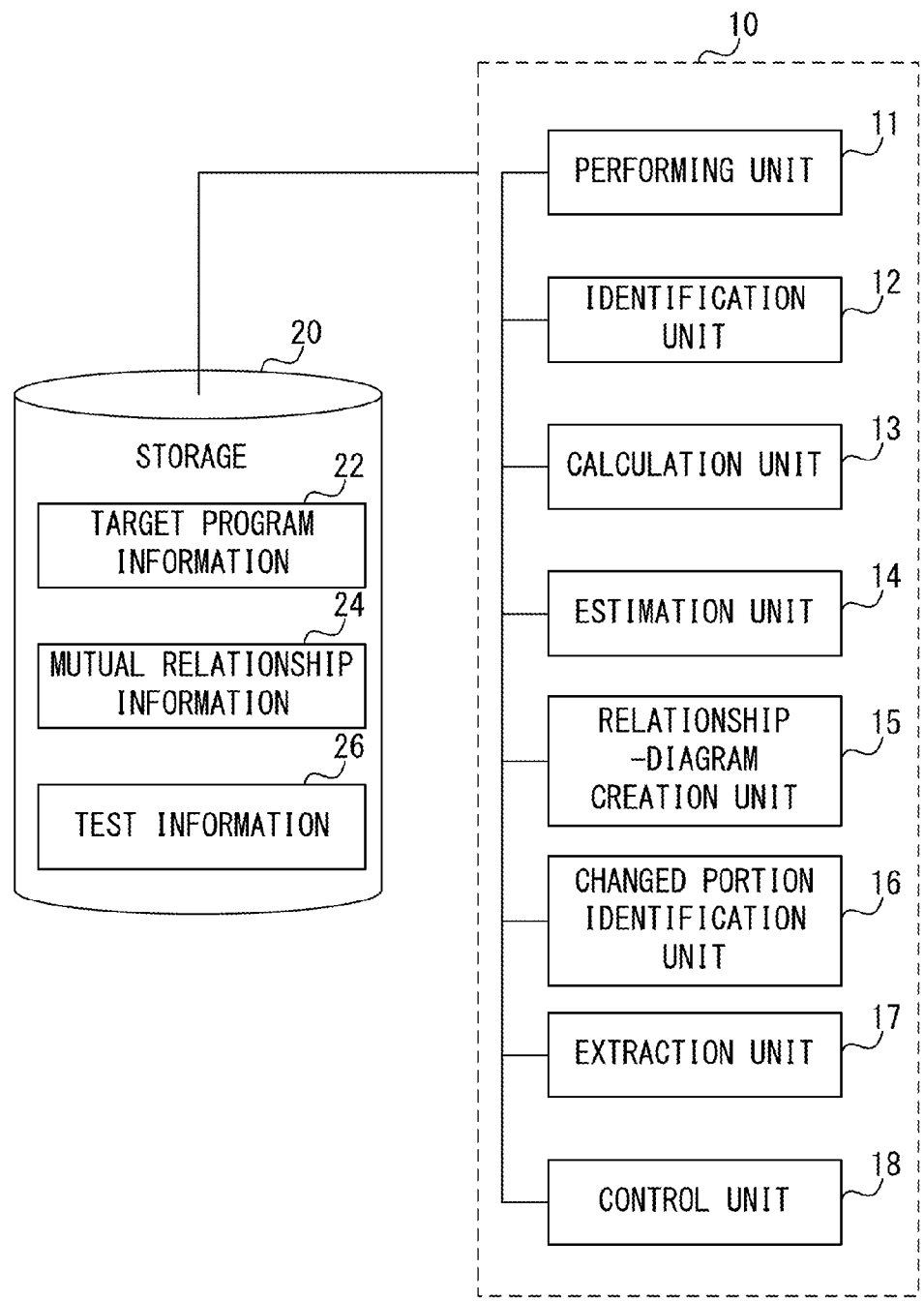
F I G. 2

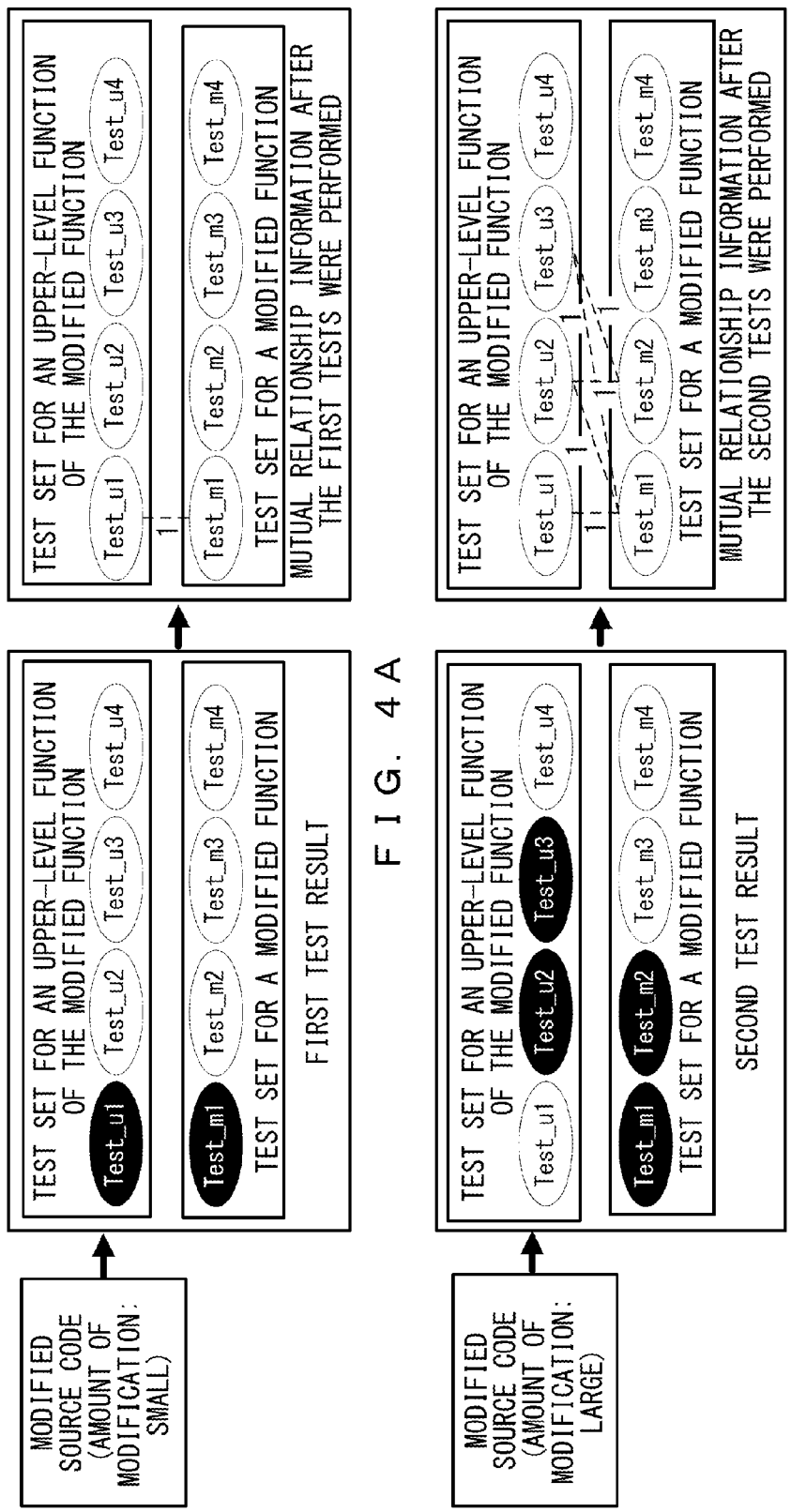

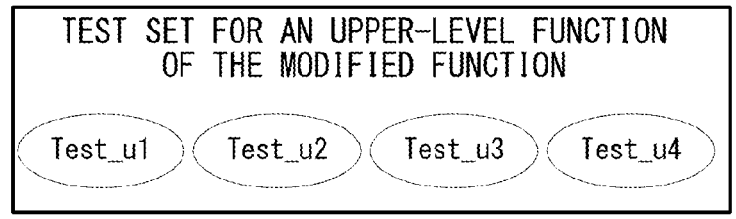
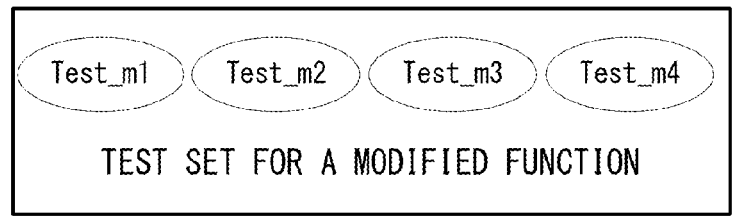
FIG. 5A
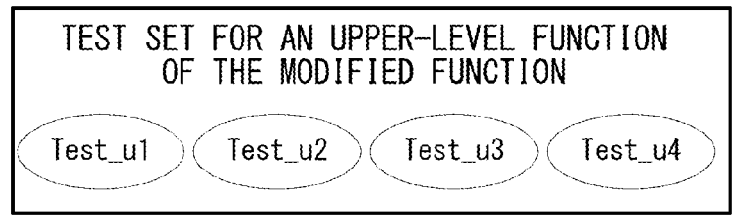
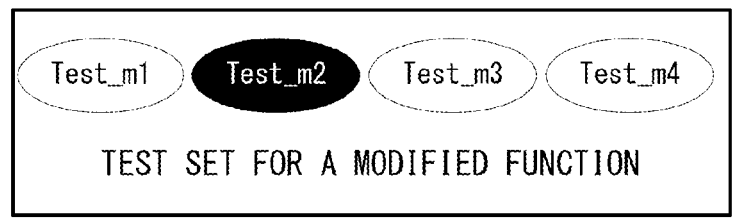
FIG. 5B
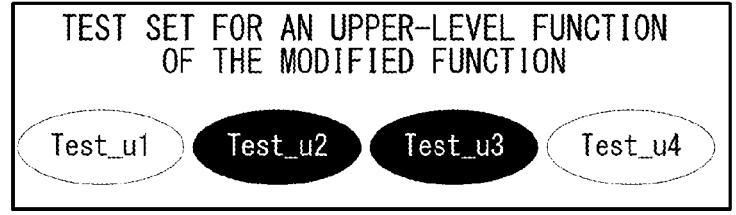
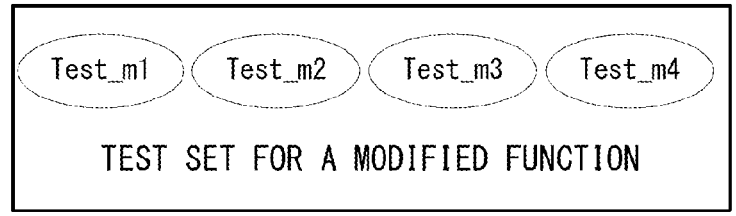
FIG. 5C

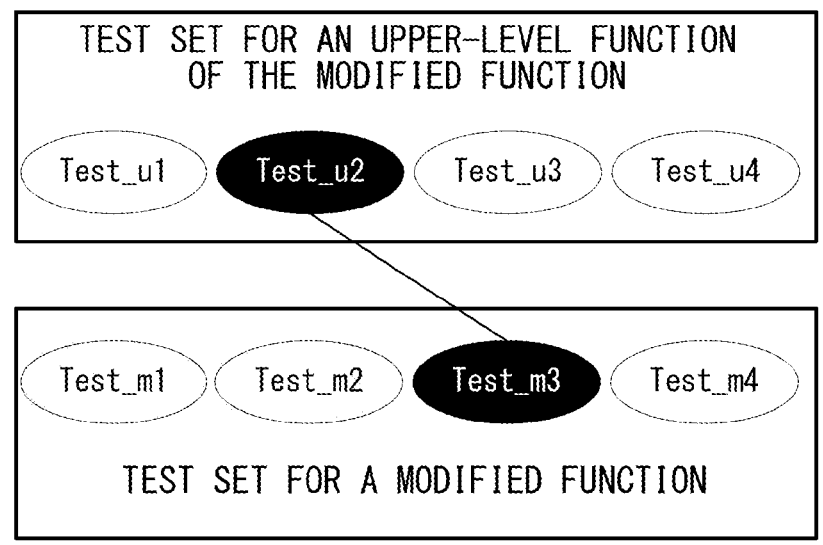
F I G. 7

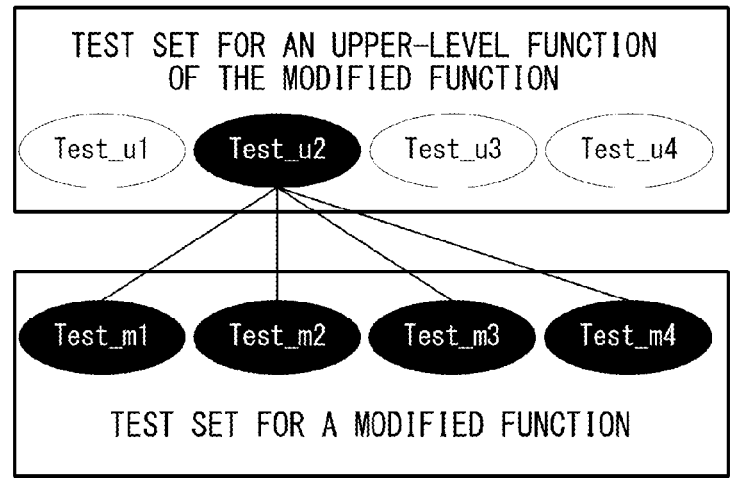
F I G. 8A
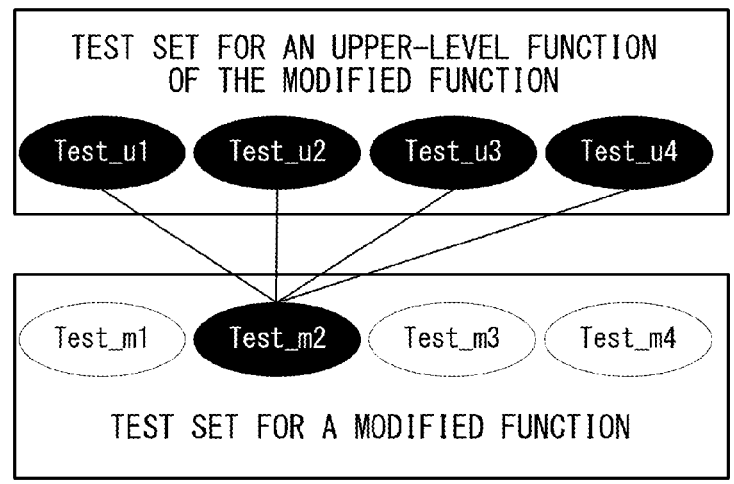
F I G. 8B
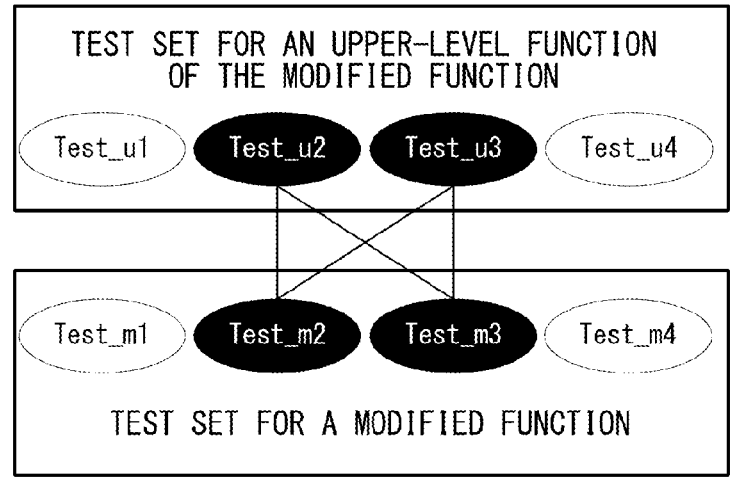
F I G. 8C

| FROM | TO | CONTENT |
|---|---|---|
| a | b | call |
| b | c | call |
| b | d | call |
| c | e | call |
| c | storage | reference |
| d | storage | update |
| e | storage | reference |

F I G. 1 1

| | a_1 | a_2 | a_3 | a_4 | a_5 | a_6 | b_1 | b_2 | b_3 | b_4 | b_5 | b_6 | c_1 | c_2 | c_3 | c_4 | d_1 | d_2 | e_1 | e_2 |
|---|---|---|---|---|---|---|---|---|---|---|---|---|---|---|---|---|---|---|---|---|
| a | O | O | O | O | O | O | | | | | | | | | | | | | | |
| b | O | O | O | O | O | O | O | O | O | O | O | O | | | | | | | | |
| c | O | O | O | O | | | O | O | O | O | O | O | O | O | O | O | | | | |
| d | | | O | O | O | O | | | O | O | | | | | O | O | O | O | | |
| e | | O | | O | | O | | O | | O | | O | | O | | O | | O | O | O |
| STORAGE | | O | | O | | O | | O | | O | | O | | O | | O | | O | | O |

FIG. 13

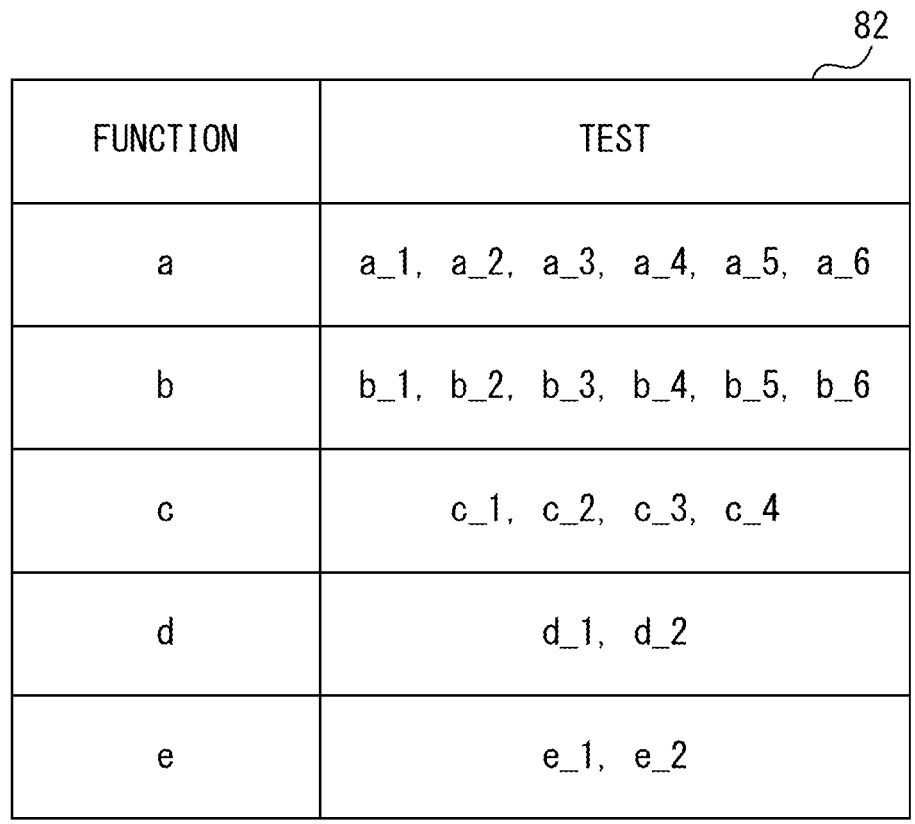
F I G. 1 4

TEST SELECTION METHOD AND TEST SELECTION APPARATUS

CROSS-REFERENCE TO RELATED APPLICATION

This application is based upon and claims the benefit of priority of the prior Japanese Patent Application No. 2015-000170, filed on Jan. 5, 2015, the entire contents of which are incorporated herein by reference.

FIELD

The embodiments discussed herein are related to a test selection program, a test selection method, and a test selection apparatus.

BACKGROUND

With the widespread use of software in recent years, it has been necessary to test and release programs within a limited time in the development of program. For example, a method called DevOps (a portmanteau of development and operations) may be introduced for the development of a program. DevOps is a method for reducing a size of a content of modification to a program for each release so as to shorten release intervals. The DevOps permits a time period from testing to releasing a program to be more limited. In other words, when using the DevOps, the amount of modification to a program at one time is small, but a time period needed for testing is limited.

Under such conditions, there is a need to maximize an effect of a test performed within a limited time. To that end, it is important to appropriately select a test to be preferentially performed, and to quickly confirm bug fixing or to find degradations.

On the other hand, with respect to efficient testing of a program, the following first to fourth technologies exist.

The first technology is a technology of a related test item presentation device that has creation means, calculation means, and extraction means. From test result data that has a test result that is a result of performing a test item, the test item, and information indicating a version on which the test item is to be performed, the creation means creates test-result-change data that has information representing whether there is a change in a test result obtained by performing one test item on each version of software. The calculation means calculates a similarity between test items on the basis of the test result change data. The extraction means extracts a related test item on the basis of the similarity.

The second technology is a technology of a test item creation device. The test item creation device includes information accumulation means, input means, and test-item extraction means. The information accumulation means accumulates therein project information and test items related to software. The input means receives an input of project information and a test item for software to be tested. The test-item extraction means extracts, from the test items accumulated in the information accumulation means, a test item used for testing software to be tested, on the basis of at least either one of the project information and a test item input to the input means.

The third technology is a technology of a development support system. In the development support system, an effect extent management database is previously created and stored. The effect extent management database stores therein an extent to be affected for each "request" (or "program") when the request (or the program) has been corrected. In other words, a "request", a program that has to be corrected when the request is corrected, and a test case that has to be performed after the correction, are associated. Further, a "program" and a test case that has to be performed when the program is corrected are associated. For example, when a failure occurs and an instruction to correct a program is issued, a "program" to be corrected is specified, the extent to be affected by the "program" is acquired from the effect extent management database, and only a test case included in the acquired extent affected by the "program" is performed as an operation retest.

The fourth technology is of a test item extraction system. On the basis of a precondition input by a precondition input unit, a test item extraction unit extracts, from among the test items managed by a test item management unit, a candidate for a test item for software to be targeted. A test item extraction unit displays, on a display of an operator, the candidates for a test item retrieved by the test item extraction unit in order of being more likely for a bug to occur, according to the rate of a bug occurring in the past. A test specification registration unit selects, from among the candidates for a test item presented by the operator, an item to be tested as a test specification of software to be targeted, and registers it as a test specification of software to be targeted in a test specification management unit.

The technology that is disclosed in each of the following documents is known:
Japanese Laid-open Patent Publication No. 2013-142967
Japanese Laid-open Patent Publication No. 2009-252167
Japanese Laid-open Patent Publication No. 2008-3985
Japanese Laid-open Patent Publication No. 2005-332098

SUMMARY

According to an aspect of the embodiment, a non-transitory computer-readable recording medium having stored therein a program for causing a computer to execute a process, the process includes: generating relationship information that includes information indicating whether there is a relationship between each pair of one of a plurality of first tests and one of a plurality of second tests, and information on the number of relationships that indicates the number of pairs having the relationship from among a plurality of the pairs, by use of a result of performing the plurality of first tests and a result of performing the plurality of second tests, wherein the plurality of first tests are performed on a specific module included in a plurality of modules that configure a program, and the plurality of second tests are performed on a module having a dependence relationship with the specific module; and when a specific test included in the plurality of first tests is designated, extracting, from among the plurality of second tests, a related test that relates to the specific test, on the basis of the relationship information and the information on the number of relationships.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 illustrates an example of a test selection apparatus according to embodiments of the present invention;

FIG. 2 is a block diagram which illustrates an example of a test selection apparatus according to a first embodiment;

FIGS. 4A and 4B illustrate examples of pieces of mutual relationship information that indicate results of tests performed after a modification was made to a target program and mutual relationships obtained from the results;

FIGS. 5A-5C illustrate examples of test results when a co-occurrence relationship does not occur;

FIG. 7 illustrates an example of a test result when the level of co-occurrence relationship is highest;

FIGS. 8A-8C illustrate examples of test results when the level of a co-occurrence relationship is medium;

FIG. 11 illustrates an example of a relationship of modules in the source information;

FIG. 13 illustrates a relationship of a test with a dependence source in the program dependence graph;

FIG. 14 is a table that illustrates tests that are associated with functions;

DESCRIPTION OF EMBODIMENTS

Figure 3:
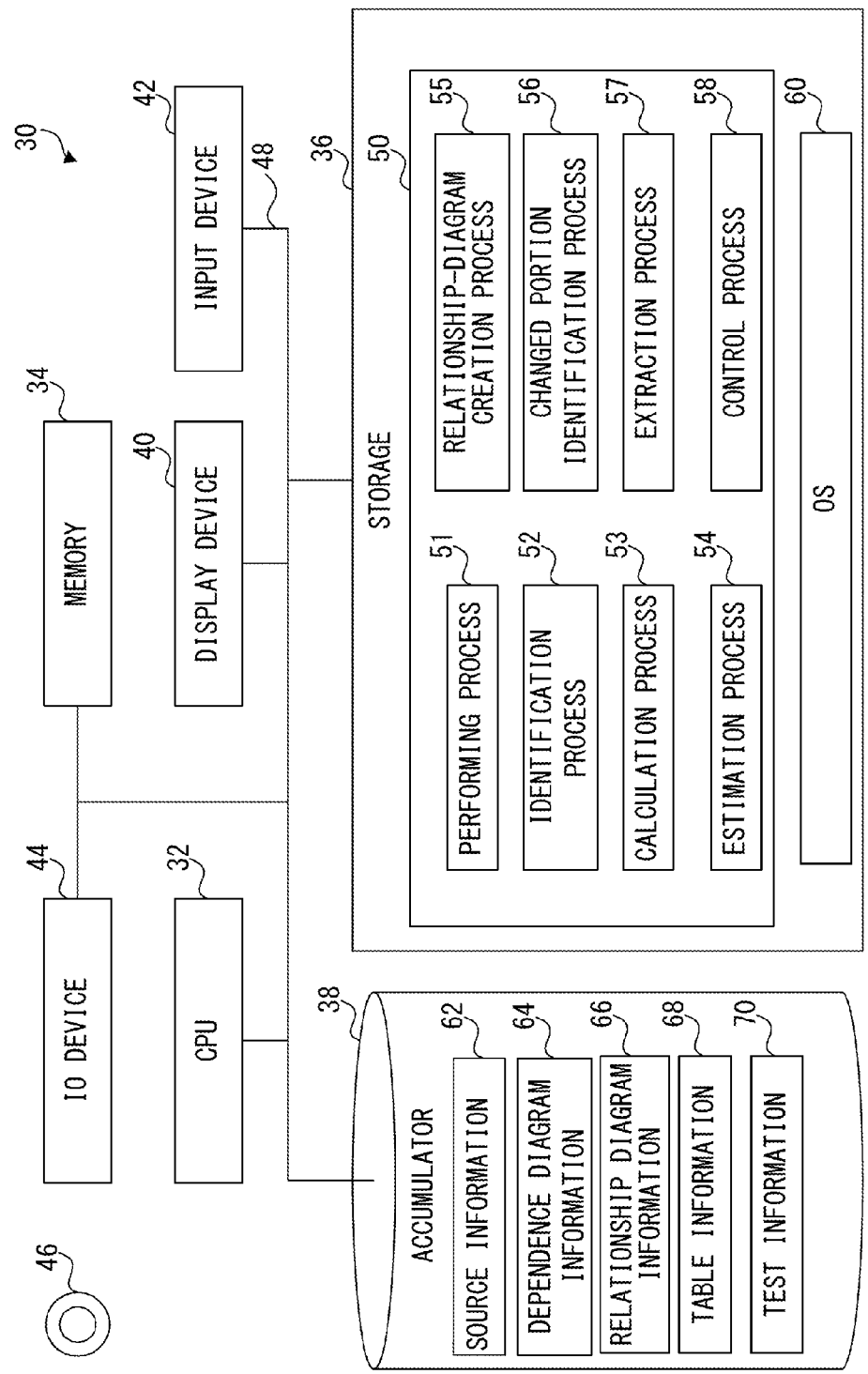
FIG. 3 is a block diagram that illustrates an example of a test selection apparatus realized by a computer.

When a program on which a test is to be performed (hereinafter referred to as a "target program") has been changed (modified), a result of performing the test on the target program may change. Further, depending on the amount of modification to the target program, the number of tests that fail from among the tests that are performed on the changed target program may change.

In this case, the value that indicates the level of change in the target program and that is a provisional amount of modification to the program that varies depending on the number of tests that have failed from among the tests that were performed on the changed target program is hereinafter referred to as "granularity". When a change with a small granularity has been made to the target program, the number of tests that fail is smaller compared to when a change with a large granularity has been made. When a change with a smallest granularity (fine grain) has been made to the target program, only a specific test fails.

In actual development, the granularity of the change is not always constant at a code change. However, the granularity of the change is not considered in the above first to fourth technologies.

Examples of embodiments of the disclosed technology will now be described in detail with reference to the drawings. The embodiments are examples of performing a test on a target program including a plurality of modules, in which the disclosed technology is used when a regression test is performed.

FIG. 1 illustrates an example of a test selection apparatus according to the embodiments of the present invention. In FIG. 1, the test selection apparatus 1 includes a generator 2, an extraction unit 3, and a determination unit 4.

The generator 2 generates relationship information that includes information indicating whether there is a relationship between each pair of one of a plurality of first tests and one of a plurality of second tests, and information on the number of relationships that indicates the number of pairs having the relationship from among a plurality of the pairs, by use of a result of performing the plurality of first tests and a result of performing the plurality of second tests. The first test is performed on a specific module included in a plurality of modules that configure a program. The second test is performed by use of modules that are identical to the plurality of modules, and is performed on a module having a dependence relationship with the specific module.

When a specific test included in the plurality of first tests is designated, the extraction unit 3 extracts, from among the plurality of second tests, a related test that relates to the specific test, on the basis of the relationship information and the information on the number of relationships.

Such a configuration permits improving of an accuracy of extracting a test relating to a designated test, from among a plurality of tests for a target program. In other words, when a designated specific test is a test that failed after the program was changed, a test to be preferentially performed with respect to the test that failed can be accurately extracted. Further, even when a change with a different granularity has been made, a related test can be extracted according to the number of co-occurrence relationships.

Furthermore, the relationship information includes information on the level of a relationship that indicates the amount of the information indicating whether there is a relationship between each pair.

Moreover, the generator 2 updates the information on the level of relationship on the basis of the information on the number of relationships and the total number of pairs of one of the first tests and one of the second tests.

Further, when a specific test included in the plurality of first tests has been designated, the extraction unit 3 extracts, from the plurality of second tests, a related test that relates to the specific test along with information on the level of relationship of a pair of the specific test and the related test, on the basis of the relationship information and the information on the number of relationships.

Such a configuration permits improving of an accuracy of the information that indicates a relationship extracted along with a designated test from among a plurality of tests for a target program.

When an instruction has been issued to perform a specific test included in the plurality of first tests, the determination unit 4 determines an order of performing extracted related tests, on the basis of the information on the level of relationship between the pair of the specific test and the related test.

Such a configuration permits determining of an order of performing tests relating to a designated test, on the basis of a relationship according to the number of co-occurrence relationships. In other words, the order of performing the tests relating to the designated test can be determined on the basis of the information that indicates a relationship with a higher accuracy.

Further, when a specific module has been changed, the generator 2 generates the relationship information and the information on the number of relationships after the change, on the basis of a result of performing the plurality of first tests for the specific module after the change, and on the basis of a result of performing the extracted related tests relating to the respective plurality of first tests, from among the plurality of second tests for a module having a dependence relationship with the specific module after the change.

Such a configuration permits improving of an accuracy of extracting a test relating to a designated test, from among a plurality of tests for a target program.

Further, an updating unit updates the information on the level of relationship on the basis of the information on the number of relationships after the change and the total number of pairs of one of the first tests and one of the second tests.

When both results of performing the paired first and second tests indicate an error, the relationship information indicates that the pair has a relationship.

First Embodiment

FIG. 2 is a block diagram which illustrates an example of a test selection apparatus according to a first embodiment. The test selection apparatus 10 includes a performing unit 11, an identification unit 12, a calculation unit 13, an estimation unit 14, a relationship-diagram creation unit 15, a changed portion identification unit 16, an extraction unit 17, and a control unit 18. Further, a storage 20 is connected to the test selection apparatus 10. The relationship-diagram creation unit 15 is an example of the generator 2. The extraction unit 17 is an example of the extraction unit 3. The control unit 18 is an example of the determination unit 4.

A target program includes a plurality of modules, and each of the plurality of modules can include one or more predetermined functions.

A test is a process for checking a function or an operation of each of the plurality of modules included in the target program. Each test is associated with a module whose function and operation are to be checked by the test.

The storage 20 stores therein target program information 22, mutual relationship information 24, and test information 26.

The target program information 22 is information that indicates a target program. Source code of the target program is an example of the target program information 22. Further, the target program information 22 can include information that indicates a change history of one target program. Further, the target program information 22 can include pieces of information that indicate the target program after the change and the target program before the change for the one target program. Furthermore, the target program information 22 may include information that indicates a dependence relationship between a plurality of modules (functions) included in the target program.

The mutual relationship information 24 is information that indicates a mutual relationship between a plurality of tests performed on a target program. Information that indicates a mutual relationship between tests for each module is an example of the mutual relationship information 24. A co-occurrence relationship is an example of the relationship between tests. The co-occurrence relationship is a relationship between tests in which, when tests are performed on the same target program, one of the tests reaches a predetermined performance result, and the other also reaches the predetermined performance result. According to the embodiments, when a program has been changed, the program before the change and the program after the change are distinguished from each other as different programs even if they have the same name. The mutual relationship information 24 can include information that discriminates a pair of tests that has a mutual relationship and information that indicates the level of relationship with respect to each mutual relationship. The mutual relationship information 24 is an example of the relationship information and the information on the number of relationships. The information that indicates the level of relationship with respect to each mutual relationship included in the mutual relationship information 24 is an example of the information on the level of relationship.

The test information 26 is information that indicates each of a plurality of tests performed on a target program. Information that indicates program source code used for performing each test and a parameter when the test is performed is an example of the test information 26.

The performing unit 11 performs each test for a target program by use of the test information 26. In particular, for example, the performing unit 11 performs a test for each of the modules having a dependence relationship with the others by use of the target program information 22.

The identification unit 12 identifies a pair of tests having a dependence relationship on the basis of a result of performing a test on each of the modules having a dependence relationship. The result of performing each test used for the identification is a result of tests performed on each of the modules in the same target program.

The calculation unit 13 calculates the strength of a mutual relationship of a pair having a mutual relationship, the pair being identified by the identification unit 12. The calculation of the strength of mutual relationship is performed on the basis of the total number of all pairs of the tests for the respective modules having a dependence relationship, and on the basis of the number of pairs having a mutual relationship, the pairs being identified by the identification unit 12. In particular, the strength of mutual relationship calculated by the calculation unit 13 is, for example, an entropy value that will be described below.

The estimation unit 14 determines whether the strength of mutual relationship calculated by the calculation unit 13 is not less than a predetermined threshold. The predetermined threshold used for the estimation is stored in advance in a predetermined storage area of the test selection apparatus 10 or in the storage 20.

On the basis of information on the pairs having a mutual relationship that are identified by the identification unit 12, and on the basis of a determination result by the estimation unit 14, the relationship-diagram creation unit 15 creates mutual relationship information 24 and stores it in the storage 20. In other words, when the estimation unit 14 has determined that the strength of mutual relationship is not less than the predetermined threshold, the relationship-diagram creation unit 15 stores, in the mutual relationship information, information that discriminates a pair having a mutual relationship identified by the identification unit 12 and information that indicates the level of relationship with respect to each mutual relationship. When there is already the mutual relationship information 24 in the storage 20, the relationship-diagram creation unit 15 updates the mutual relationship information 24 on the basis of the information on a pair having a mutual relationship that is identified by the identification unit 12, and on the basis of the determination result by the estimation unit 14. In particular, the information that indicates the level of relationship with respect to each mutual relationships is, for example, a co-occurrence relationship coefficient K that will be described below.

The changed portion identification unit 16 identifies a changed portion in a target program on the basis of the target program information 22. For example, the identification of a changed portion is performed on the basis of, for example, information that indicates a change history included in the target program information 22.

When a test for a target program is designated, the extraction unit 17 extracts a test having a mutual relationship with the designated test (hereinafter referred to as "related test") along with information that indicates the level of relationship with respect to each mutual relationship.

The control unit 18 controls so as to cause the performing unit 11 to perform a test that relates to a module corresponding to the changed portion identified by the changed portion identification unit 16. In particular, first, the control unit 18 causes the performing unit 11 to perform the test for the module corresponding to the changed portion. Then, the control unit 18 identifies a test that reached a predetermined result as a result of performing the test for the module corresponding to the changed portion. Next, the control unit 18 specifies the identified test and designates the extraction unit 17 to extract a test relating to the identified test. Then, the control unit 18 causes the performing unit 11 to perform the tests extracted by the extraction unit in the order according to the level of each mutual relationship. Accordingly, for example, a range in which a regression test is performed due to a change such as a program modification can be restricted, and a time for processing a test can be reduced.

FIG. 3 is a block diagram that illustrates an example of a test selection apparatus realized by a computer. A computer 30 includes a CPU 32, a memory 34, a nonvolatile storage 36, and an accumulator 38. The CPU 32, the memory 34, the storage 36, and the accumulator 38 are connected to one another via a bus 48. Further, the computer 30 includes a display device 40 such as a display, and an input device 42 such as a keyboard and a mouse, and the display device 40 and the input device 42 are connected to the bus 48. Furthermore, a recording medium 46 is inserted into the computer 30, and a device (IO device) for reading and writing in the inserted recording medium is connected to the bus 48. The storage 36 and the accumulator 38 can be realized by a HDD (hard disk drive) or a flash memory. Moreover, the computer 30 can include an interface for connecting to, for example, a computer network.

The storage 36 has stored therein an OS (operating system) and a test program 50 that causes the computer 30 to function as the test selection apparatus 10. The test program 50 includes a performing process 51, an identification process 52, a calculation process 53, an estimation process 54, a relationship-diagram creation process 55, a changed portion identification process 56, an extraction process 57, and a control process 58. If the CPU 32 reads the test program 50 from the storage 36 and deploys it in the memory 34 so as to perform each process included in the test program 50, the computer 30 operates as the test selection apparatus 10 illustrated in FIG. 2. Further, if the CPU 32 performs the performing process 51, the computer 30 operates as the performing unit 11 illustrated in FIG. 2, and if the CPU 32 performs the identification process 52, the computer 30 operates as the identification unit 12 illustrated in FIG. 2. Furthermore, if the CPU 32 performs the calculation process 53, the computer 30 operates as the calculation unit 13 illustrated in FIG. 2, and if the CPU 32 performs the estimation process 54, the computer 30 operates as the estimation unit 14 illustrated in FIG. 2. Moreover, if the CPU 32 performs the relationship-diagram creation process 55, the computer 30 operates as the relationship-diagram creation unit 15 illustrated in FIG. 2, and if the CPU 32 performs the changed portion identification process 56, the computer 30 operates as the changed portion identification unit 16 illustrated in FIG. 2. Further, if the CPU 32 performs the extraction process 57, the computer 30 operates as the extraction unit 17 illustrated in FIG. 2, and if the CPU 32 performs the control process 58, the computer 30 operates as the control unit 18 illustrated in FIG. 2.

The accumulator 38 has accumulated therein source information 62, dependence diagram information 64, relationship diagram information 66, table information 68, and test information 70. The source information 62 indicates source code of a target program. The dependence diagram information 64 indicates a dependence relationship between modules that include functions in the source code of the target program. The relationship diagram information 66 indicates a mutual relationship between individual tests that are associated with the modules including functions in the source code of the target program. The table information 68 indicates various tables. The test information 70 indicates information on source code for each of the individual tests. The accumulator 38 corresponds to the storage 20 illustrated in FIG. 2. The source information 62 corresponds to the target program information 22 illustrated in FIG. 2. The dependence diagram information 64, the relationship diagram information 66, and the table information 68 correspond to the mutual relationship information 24 illustrated in FIG. 2. The test information 70 corresponds to the test information 26 illustrated in FIG. 2.

A program dependence graph is an example of a technology that represents a dependence relationship between functions in source code of a target program.

Further, the test selection apparatus 10 may permit a connection to a computer network. In other words, the test selection apparatus 10 is not limited to a connection to or a disconnection from a computer network. A test selection apparatus 10 may be realized only by a computer 30, as is the case with the example of the test selection apparatus 10 in the disclosed technology, or may be realized by a plurality of computers.

Next, an operation of the present embodiment will be described.

When a target program whose operation had been so far ensured by a test has been changed, selecting a test to be preferentially performed for checking an affect of the change contributes to an efficient test-performing. A change that has an effect, due to a relationship between modules including functions in a target program, on modules including other functions, not a modification that indicates a simple difference in source code such as a modification of a constant, is an example of a changed content in a target program.

In the embodiments, a test to be preferentially performed is selected according to the changed content. From among the tests for a target program, a test of a portion that has nothing to do with the applied change reaches a result that remains unchanged before and after the change. Accordingly, it is inefficient to re-perform, after a change, such a test of a portion that has nothing to do with the change. Therefore, in the embodiments, when selecting a test to be preferentially performed after a change in target program, a test of a portion to which the change has been applied and a test of the range affected by the change are selected.

In particular, first, the test selection apparatus according to the embodiments performs tests of a portion to which the change has been applied. Then, the test selection apparatus identifies a test that failed from the performed tests, and selects a test that has a mutual relationship with the identified test as a test of the range affected by the change and performs it. Specifically, the mutual relationship is a co-occurrence relationship.

As described above, the co-occurrence relationship is a relationship between tests in which, when tests are performed on the same target program, one of the tests reaches a predetermined performance result, and the other also reaches the predetermined performance result. Thus, a test that has a co-occurrence relationship with a test that failed from among the tests of a portion to which the change has been applied is likely to fail as well when it is performed after the change. Therefore, such a test having a co-occurrence relationship is likely to be a test of the range affected by the change.

In the embodiments, from the results of tests performed on a target program in the past, mutual relationship information that indicates a mutual relationship between tests (co-occurrence relationship) is recorded as mutual relationship information. Then, by use of this mutual relationship information, a test that has a mutual relationship with the test that failed from among the tests of a portion to which the change has been applied is extracted.

In the embodiments, further, each co-occurrence relationship between tests is distinguished according to the amount of information when the co-occurrence relationship occurs. The reason for this will be described with reference to FIGS. 4A and 4B FIG. 4A illustrates an example of mutual relationship information that indicates a result of tests performed after a first modification was made to a target program and a mutual relationship (co-occurrence relationship) obtained from the result. FIG. 4B illustrates an example of mutual relationship information that indicates a result of tests performed after a second modification was made to the target program and a mutual relationship (co-occurrence relationship) obtained from the result. FIGS. 4A and 4B illustrate an example in which the amount of modification is small in the first modification, and the amount of modification is large in the second modification.

The test results in FIGS. 4A and 4B (as well as in FIGS. 5 to 8 below) indicate a result of performing four tests for a modified function (test_m1 to test_m4) and a result of performing four tests for an upper-level function of the modified function (test_u1 to test_u4). In the performance results of FIGS. 4A and 4B, the tests represented by solid black indicate that they have failed as a performance result, and the tests represented by solid white indicate that a normal performance result has been obtained.

As seen from the test result in FIG. 4A, test_m1 and test_u1 have failed. In this case, a co-occurrence relationship has occurred between one pair, (test_m1, test_u1). Thus, the information that indicates that a co-occurrence relationship has occurred between (test_m1, test_u1) is stored in the mutual relationship information in FIG. 4A. This is represented by a line between (test_m1, test_u1) (hereinafter referred to as "co-occurrence line") in the mutual relationship information of FIG. 4A. "1" next to the co-occurrence line indicates the number of times a co-occurrence relationship occurred between (test_m1, test_u1) in the past.

On the other hand, in FIG. 4B, test_m1 and test_m2, and test_u2 and test_u3 have failed. In this case, a co-occurrence relationship has occurred between four pairs, (test_m1, test_u2), (test_m1, test_u3), (test_m2, test_u2), and (test_m2, test_u3). Thus, the information that indicates that a co-occurrence relationship has occurred between (test_m1, test_u2), (test_m2, test_u2), (test_m2, test_u2), and (test_m2, test_u3) is stored in the mutual relationship information of FIG. 4B. In this case, the mutual relationship information of FIG. 4B has been updated including the information on the co-occurrence relationship that occurred in the test performed after the first change, that is, the mutual relationship information of FIG. 4A.

In this case, the co-occurrence relationship that occurred in the first test and the co-occurrence relationship that occurred in the second test have different amounts of information than each other. In other words, while only one co-occurrence relationship occurs in the first test, four co-occurrence relationships occur in the second test. A co-occurrence relationship such as that that occurs the first time has a stronger relationship than the co-occurrence relationships that occur the second time.

The amount of information on a co-occurrence relationship that occurs for a certain modification is larger if the proportion of the number of co-occurrence relationships that actually occurred to the number of co-occurrence relationships that may occur is smaller. In other words, one co-occurrence relationship that occurred in FIG. 4A has an amount of information that is larger than each of the four co-occurrence relationships that occurred in FIG. 4B, and its relationship is stronger than those in FIG. 4B. In this case, "the number of co-occurrence relationships that may occur" indicates the total number of pairs of tests between the two test sets ((test_m1 to test_m4) and (test_u1 to test_u4)). In both FIGS. 4A and 4B, the number of co-occurrence relationships that may occur is "16". One or more tests that are associated with the same function are hereinafter referred to as a "test set".

However, when all the co-occurrence relationships are stored in the mutual relationship information without distinguishing them on the basis of the amount of information of each co-occurrence relationship, it is not possible to determine which co-occurrence relationship is stronger.

In the embodiments, each co-occurrence relationship is distinguished on the basis of the amount of information of the co-occurrence relationship and is stored in the mutual relationship information. The amount of information of a co-occurrence relationship is a measure indicating to what extent a co-occurrence relationship is less likely to occur when it occurred. In particular, in the embodiments, the strength of relationship of each co-occurrence relationship is represented by use of a value obtained by using Formula 1 below (hereinafter referred to as "entropy").

$$\text{Entropy} = -\log(\text{the number of co-occurrence relationships that occurred in a test/the number of co-occurrence relationships that may occur}) \quad \text{(Formula 1)}$$

When a co-occurrence relationship does not occur, the entropy value is "zero".

As illustrated in FIGS. 4A and 4B, there may be a mutual relationship between the amount of modification of source code and the number of times a co-occurrence relationship occurs. If the modified or changed content for source code is smaller, the number of cases of tests that fail in each test set is smaller, and then portions that fail in a co-occurring manner appear locally. On the other hand, if the modified or changed content for source code is larger, the number of cases of tests that fail in each test set is greater, and then portions that fail in a co-occurring manner appear extensively. Thus, when the amount of modification in source code is large, a co-occurrence relationship that makes a small contribution to a prediction may be obtained, so it is important to reflect it in the mutual relationship information according to the amount of information.

Referring to FIGS. 5 to 8, examples of results of tests performed after various modifications were made and the values of an entropy obtained at that time will now be described.

FIGS. 5A-5C illustrate examples of test results when a co-occurrence relationship does not occur. In FIG. 5A, all the tests of test_m1 to test_m4 and test_u1 to test_u4 have been completed normally. In FIG. 5B, test_m2 has failed, and all the other tests have been completed normally. In FIG. 5C, test_u2 and test_u3 have failed, and all the other tests have been completed normally. As illustrated in FIGS. 5A-5C, even if one or more tests in any one of the two test sets having a dependence relationship fail, a co-occurrence relationship does not occur when none of the tests in another test set fails. As described above, when a co-occurrence relationship does not occur, the entropy value is "zero".

Figure 6:
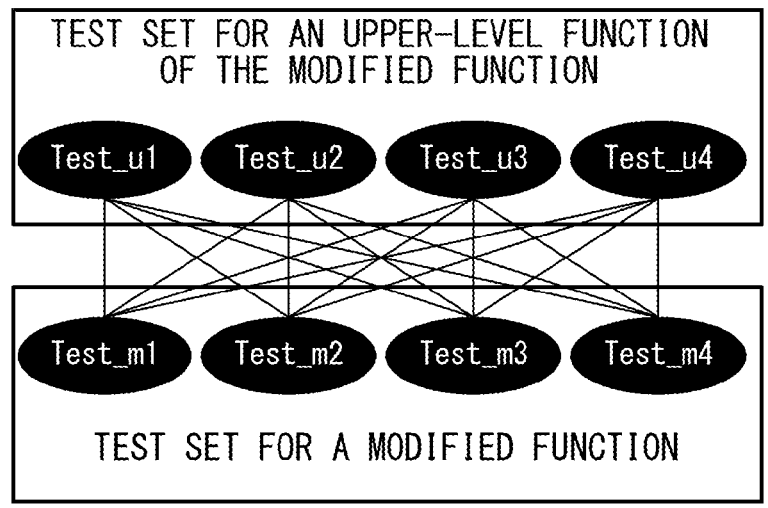
FIG. 6 illustrates an example of a test result when the level of co-occurrence relationship is lowest.

FIG. 6 illustrates an example of a test result when the level of co-occurrence relationship is lowest. In FIG. 6, all the tests of test_m1 to test_m4 and test_u1 to test_u4 have failed. In this case, a co-occurrence relationship occurs in all pairs, and the entropy value is "−log(16/16)=0".

FIG. 7 illustrates an example of a test result when the level of co-occurrence relationship is highest. In FIG. 7, the two tests, test_m3 and test_u2, have failed. In this case, a co-occurrence relationship occurs in the pair (test_m3, test_u2), and the entropy value is "−log(1/16)≈1.20".

FIGS. 8A-8C illustrate examples of test results when the level of co-occurrence relationship is medium. In FIG. 8A, a co-occurrence relationship occurs in the four pairs (test_m1, test_u2), (test_m2, test_u2), (test_m3, test_u2), and (test_m4, test_u2). In FIG. 8B, a co-occurrence relationship occurs in the four pairs (test_m2, test_u1), (test_m2, test_u2), (test_m2, test_u3), and (test_m2, test_u4). In FIG. 8C, a co-occurrence relationship occurs in the four pairs (test_m2, test_u2), (test_m2, test_u3), (test_m3, test_u2), and (test_m3, test_u3). In all the examples of FIGS. 8A-8C, the entropy value is "−log(4/16)≈0.6".

The entropy values in various cases of a result of performing tests have been described above. As seen from above, in the embodiments, distinguishing each co-occurrence relationship according to the amount of information when the co-occurrence relationship occurs permits improving of an accuracy of a relationship between a pair.

Figure 9A:
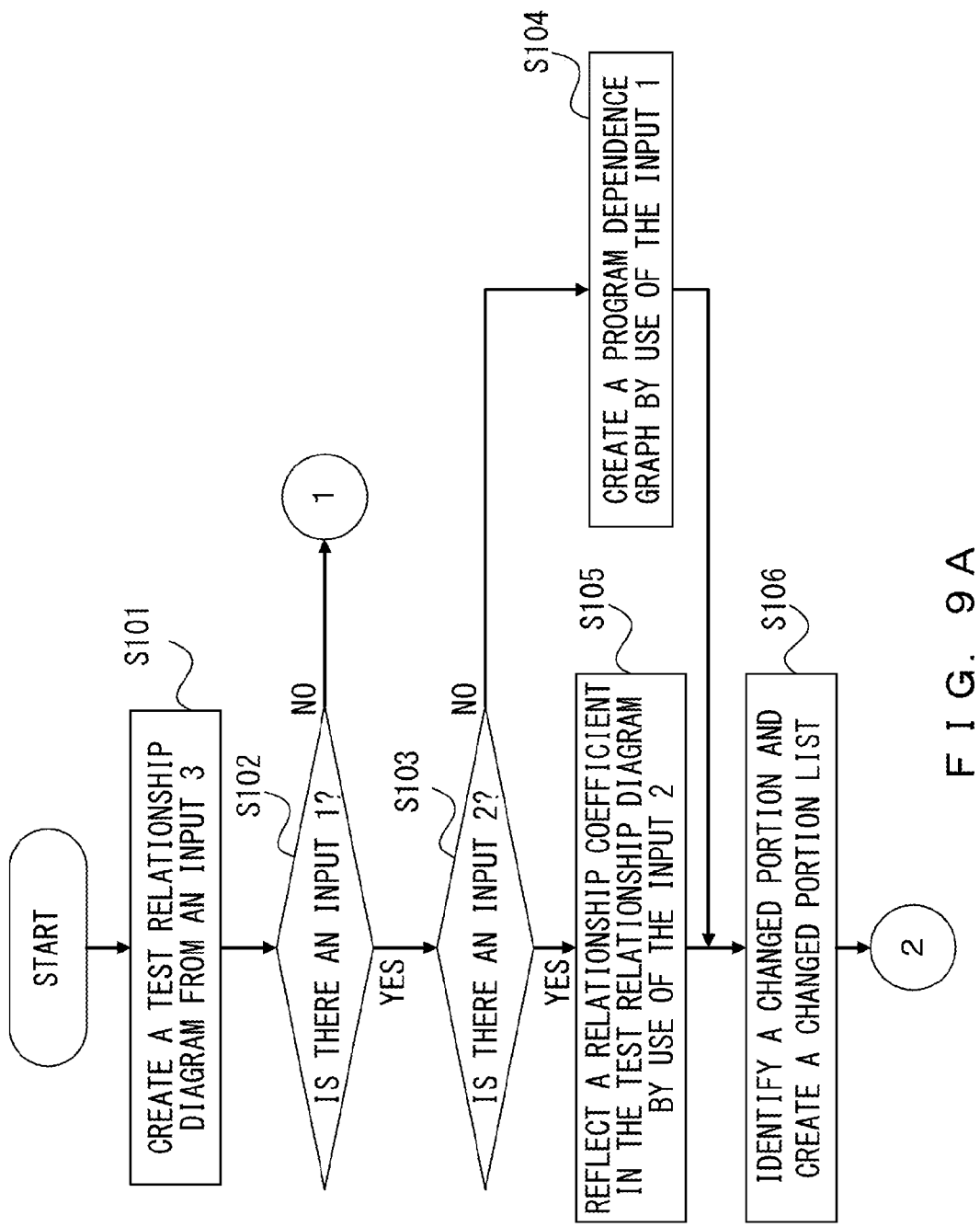
FIG. 9A is a flowchart (1) that illustrates a flow of test processing in the test selection apparatus.
Figure 9B:
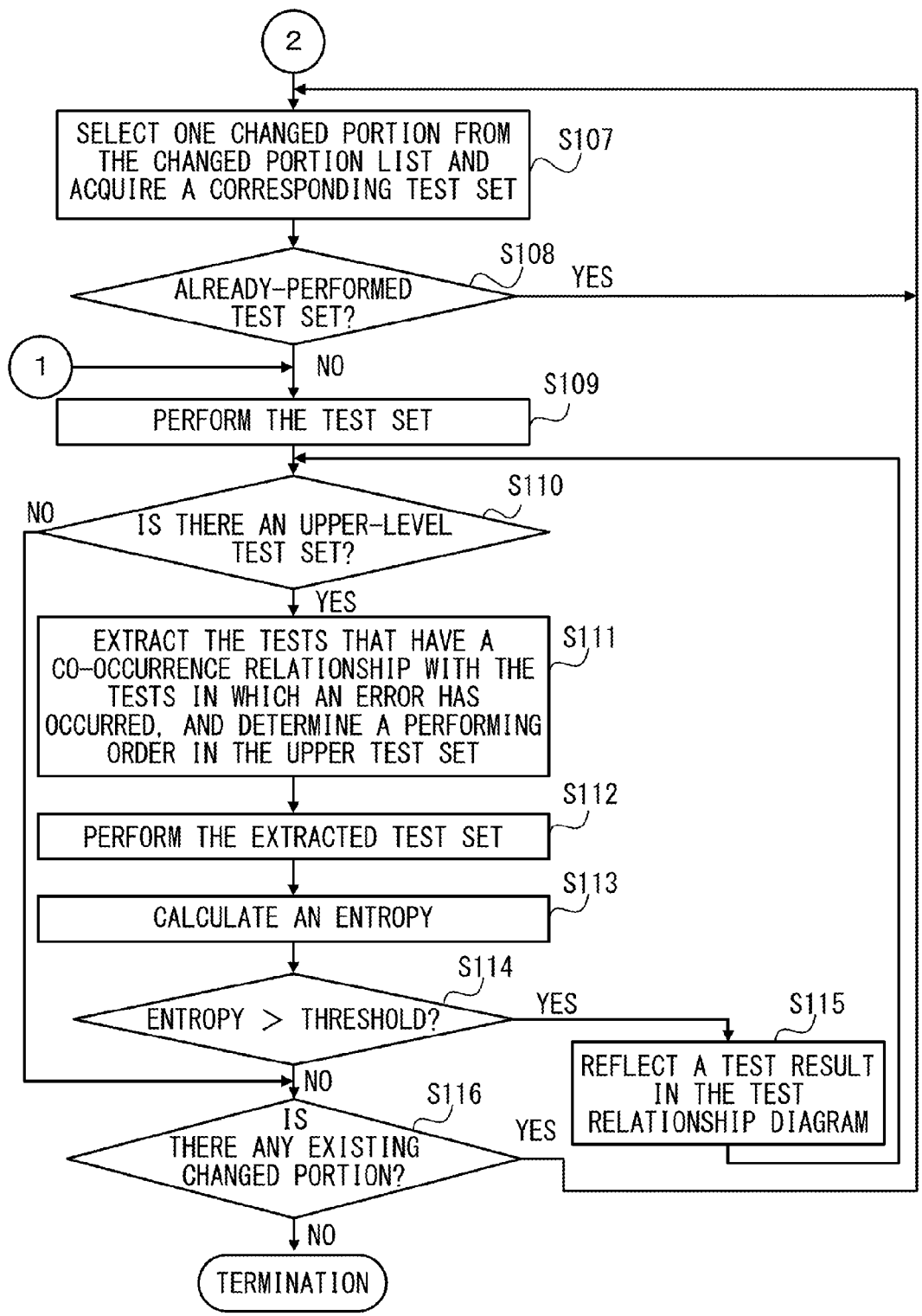
FIG. 9B is a flowchart (2) that illustrates a flow of test processing in the test selection apparatus.

Next, a flow of test processing in the test selection apparatus according to the first embodiment will be described. FIG. 9A is a flowchart (1) that illustrates an example of a flow of test processing in the test selection apparatus according to the first embodiment. FIG. 9B is a flowchart (2) that illustrates an example of a flow of test processing in the test selection apparatus according to the first embodiment.

The test flow illustrated in FIGS. 9A and 9B is processing performed by the test program 50 that is executed as an example of the test program of the disclosed technology. Information that indicates an input 1 will be described below as information that indicates source code before a target program is changed. Further, information that indicates an input 2 will be described as information that indicates a test relationship diagram corresponding to the source code before the target program is changed. Furthermore, information that indicates an input 3 will be described as information that indicates source code after the target program is changed and information that indicates a test corresponding to the source code after the target program is changed.

First, the CPU 32 starts performing each process included in the test program 50. In particular, in Step 101, the CPU 32 reads a target program by acquiring the source information 62 from the accumulator 38. Next, in Step 102, the CPU 32 performs processing of creating a test relationship diagram by use of the information that indicates the input 3.

The processing of creating a test relationship diagram performed by the CPU 32 in Step 101 will now be described. In the processing of creating a test relationship diagram, first, the source information 62 of the target program is analyzed, and a program dependence graph of the target program is created. Then, for the created program dependence graph of the target program, a test relationship diagram with which each test is associated on the basis of a result of performing the test is created.

Figure 10:
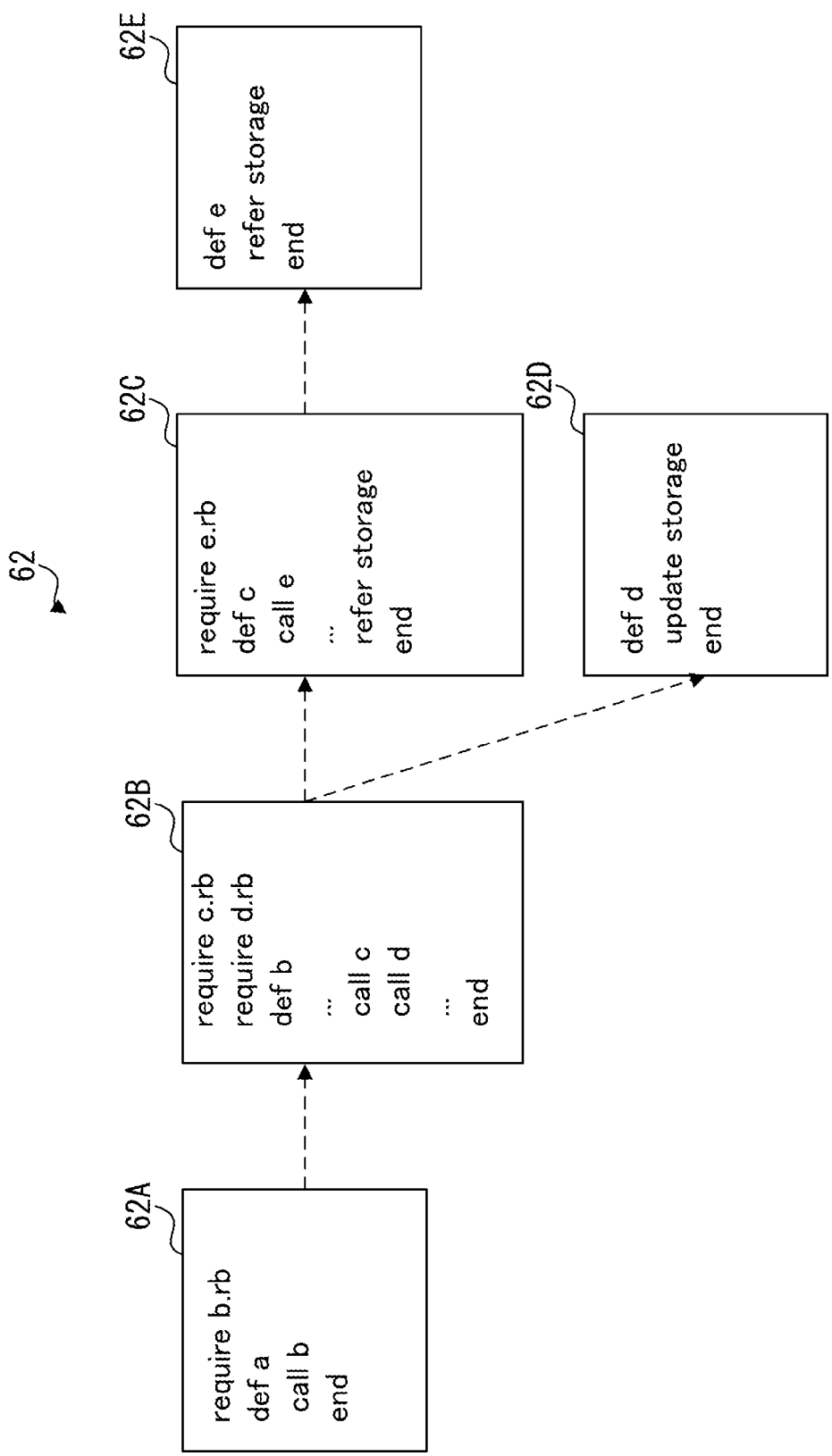
FIG. 10 illustrates an example of source code of a target program.
Figure 12:
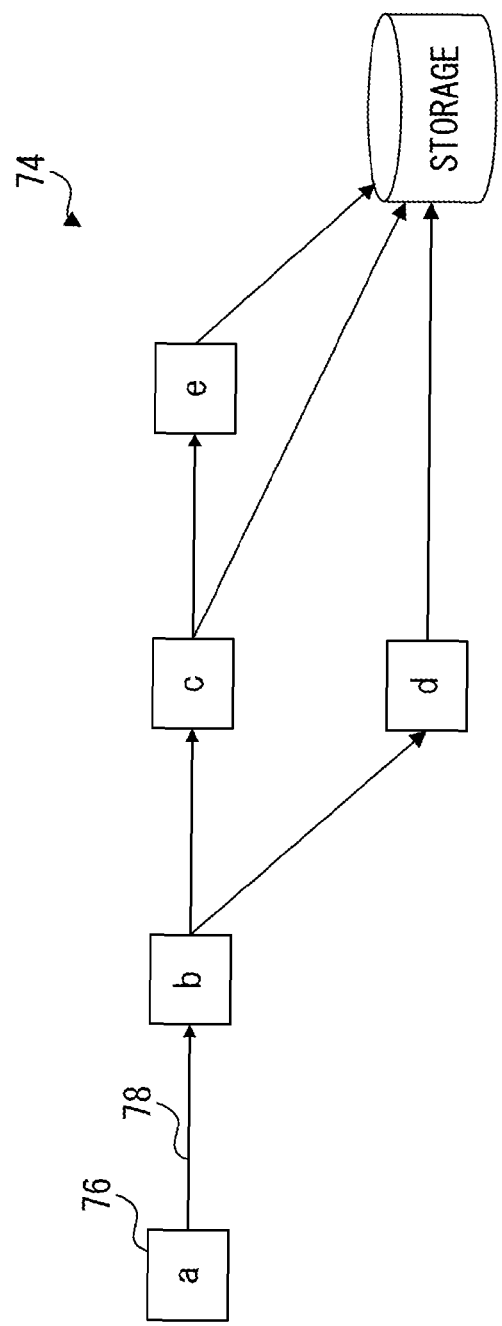
FIG. 12 illustrates an example of a program dependence graph of the target program.

FIG. 10 illustrates an example of source code 62 of a target program, and FIG. 11 illustrates an example of information that indicates a relationship of modules in the source information 62. Further, FIG. 12 illustrates an example of a program dependence graph 74 of the target program. An example in which a module corresponds to a function will be described below. The source program 62 of the target program is classified for each function into pieces of source code 62A, 62B, 62C, 62D, and 62E, and the classified pieces of source code 62A to 62E are respectively related to one another according to the content of executing, for example, a command. In FIG. 10, a function a corresponds to the source code 62A, a function b to the source code 62B, a function c to the source code 62C, a function d to the source code 62D, and a function e to the source code 62E. Each of the pieces of source code 62A to 62E that correspond to the respective functions is a starting point for a dependence relationship with at least one of the pieces of source code other than itself and a device. A control dependence relationship and a data dependence relationship are examples of the dependence relationship. Further, a storage having stored therein data is an example of the device.

Analyzing the source information 62 permits the CPU 32 to obtain pieces of information that indicate a dependence source of dependence relationship, a dependence destination of dependence relationship, and a content of dependence relationship, respectively, as illustrated in FIG. 11. FIG. 11 illustrates a table 72 of pieces of information indicating a dependence source ("FROM" column) of dependence relationship, a dependence destination ("TO" column) of dependence relationship, and a content ("CONTENT" column) of dependence relationship, respectively, for the functions a to e. The information that indicates the table 72 is associated with the source information 62 of the target program, and is stored in the accumulator 38 (FIG. 3) as dependence diagram information 64 that indicates a program dependence graph 74. The information that indicates the table 72 may be stored in the accumulator (FIG. 3), as included in table information 68.

The CPU 32 creates the program dependence graph 74 of the target program by use of the table 72 illustrated in FIG. 11. FIG. 12 illustrates a program dependence graph 74 of the target program that is created by the table 72 illustrated in FIG. 11. The functions a to e in FIG. 11 are represented as a node 76 in FIG. 12. Further, the program dependence graph 74 of the target program illustrated in FIG. 12 illustrates an oriented segment 78 connecting between nodes or between a node and a device. The oriented segment 78 represents a relationship that has an effect when a content of a function that is a node 76 has been changed as a connection relationship that associates a function with a function or a function with a device.

Next, processing in which a test is associated with each of the functions a to e that is represented as a node 76 in the program dependence graph 74 of the target program will be described. For one or more tests included in the test information 70, a target program to which each of the tests is to be applied is determined in advance. However, the one or more tests are not applied to all the functions in the target program to be applied to, but the CPU 32 detects which of the functions in the target program each test is performed for, using the following processing. In other words, the CPU 32 performs each test on the target program and detects a function that is to be verified by each of the tests, so as to associate tests with each of the functions a to e.

In particular, first, the CPU 32 performs each test for testing a target program, and detects a function through which the tests passed in the target program. Then, the CPU 32 associates a performed test with information on a function through which the test passed, and stores it in a function-passing-through table 80.

FIG. 13 illustrates an example of a function-passing-through table 80. In the function-passing-through table 80 of FIG. 13, functions through which performed tests passed are represented by circle symbols. Further, the example of FIG. 13 corresponds to the example of FIG. 10 and is an example of passing through from the upper level to the lower level, in order of the functions a to e and the storage.

A function through which a performed test passed is related to the performed test, and from among the functions through which the tests passed, the function at the top in the program dependence graph 74 is a function that is a starting point. Next, the CPU 32 associates the function that is a starting point and has been detected in this way with a performed test.

For example, in the function-passing-through table 80 of FIG. 13, for the tests a_1 to a_6, the function at the top from among the functions through which the performed tests passed is the function a. Further, for the tests b_1 to b_6, c_1 to c_6, d_1 and d_2, and e_1 and e_2, the functions at the top from among the functions through which the performed tests passed are the functions b, c, d, and e, respectively. Therefore, the CPU 32 associates the tests a_1 to a_6, b_1 to b_6, c_1 to c_6, d_1 and d_2, and e_1 and e_2 with the functions a, b, c, d, and e, respectively.

Next, the CPU 32 stores a result of associating tests with functions in a function test table 82. FIG. 14 illustrates each function of a target program and tests that are associated with each of the functions. In FIG. 14, information that indicates that the tests a_1 to a_6 are associated with the function a is stored in the function test table 82. Further, pieces of information that each indicate that the tests b_1 to b_6 are associated with the function b, the tests c_1 to c_6 with the function c, the tests d_1 and d_2 with the function d, and the tests e_1 and e_2 with the function e, are stored in the function test table 82. Information that indicates the function test table 82 illustrated in FIG. 14 is stored in the accumulator 38 (FIG. 3), as included in table information 68.

The function test table 82 may be stored in the accumulator 38 in advance. When the function test table 82 has already been stored in the accumulator 38, processing of creating the function-passing-through table 80 and the function test table 82 can be omitted.

Figure 15:
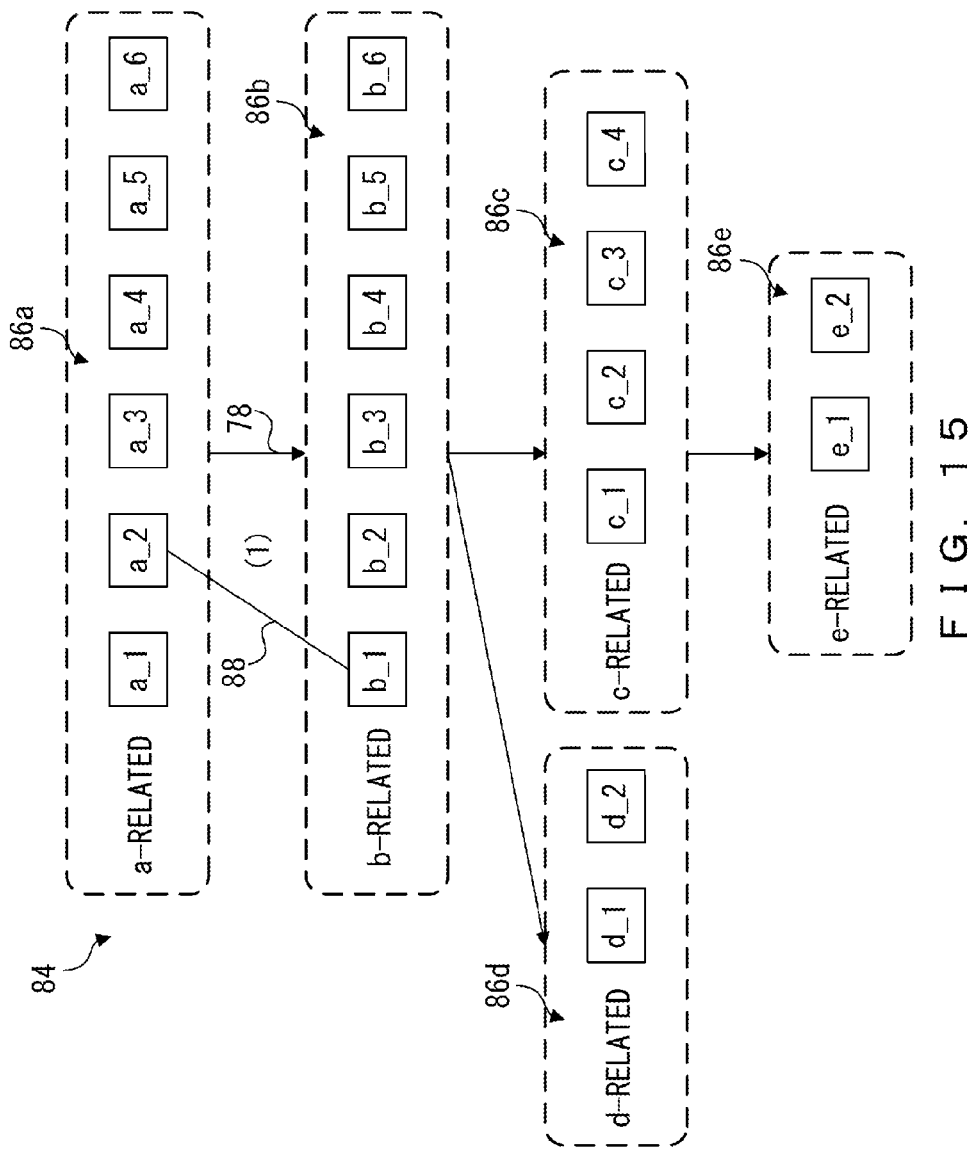
FIG. 15 illustrates an example of a test relationship diagram.

Next, the CPU 32 creates a test relationship diagram 84 by use of the program dependence graph 74 (FIG. 12) and the function test table 82 (FIG. 14). In the test relationship diagram 84 to be created, a test set 86 that is formed by one or more tests associated with each function is associated with a node 76 in the program dependence graph 74 of the target program. FIG. 15 illustrates an example of a test relationship diagram 84. One or more tests that are associated with a function are hereinafter referred to as "test set 86". When distinguishing test sets 86 for each function, they are illustrated with a mark that represents a function. In the test relationship diagram 84 illustrated in FIG. 15, tests a_1 to a_6 associated with the function a are represented as a test set 86a, and tests b_1 to b_6 associated with the function b as a test set 86b. Likewise, tests c_1 to c_4 are represented as a test set 86c, tests d_1 and d_2 as a test set 86d, and tests e_1 and d_2 as a test set 86e.

Further, the test relationship diagram 84 can also represent a co-occurrence relationship. The co-occurrence relationship refers to a relationship between a plurality of tests in which an error has occurred when performing the tests for the same target program. In other words, the co-occurrence relationship is a relationship between a test for a node and a test for another node with respect to a plurality of tests in which an error has occurred as a result of sequentially performing the tests included in the test sets 86 on nodes for the same target program. In the present embodiment, a mutual relationship between a test for a certain node in which an error has occurred and a test for a node that has a dependence relationship with the certain node and that is the upper node of the certain node will be described as a co-occurrence relationship. For the co-occurrence relationship, the level of co-occurrence relationship is represented by a co-occurrence relationship coefficient K. The accumulated number of times and the probability that a co-occurrence relationship occurred are examples of the co-occurrence relationship coefficient K.

The test relationship diagram 84 in FIG. 15 illustrates an example of a case in which a co-occurrence relationship has occurred between the test a_2 and the test b_1, and this co-occurrence relationship is represented by connecting the test a_2 and the test b_1 by use of a co-occurrence line 88. Further, the test relationship diagram in FIG. 15 illustrates a co-occurrence relationship coefficient K with "(1)" near the co-occurrence line 88.

The CPU 32 creates a co-occurrence table by use of the program dependence graph 74 (FIG. 12) and the function test table 82 (FIG. 14) as well as creating the test relationship diagram 84. The co-occurrence table indicates a co-occurrence relationship created as a result of performing tests for a target program.

Figure 16:
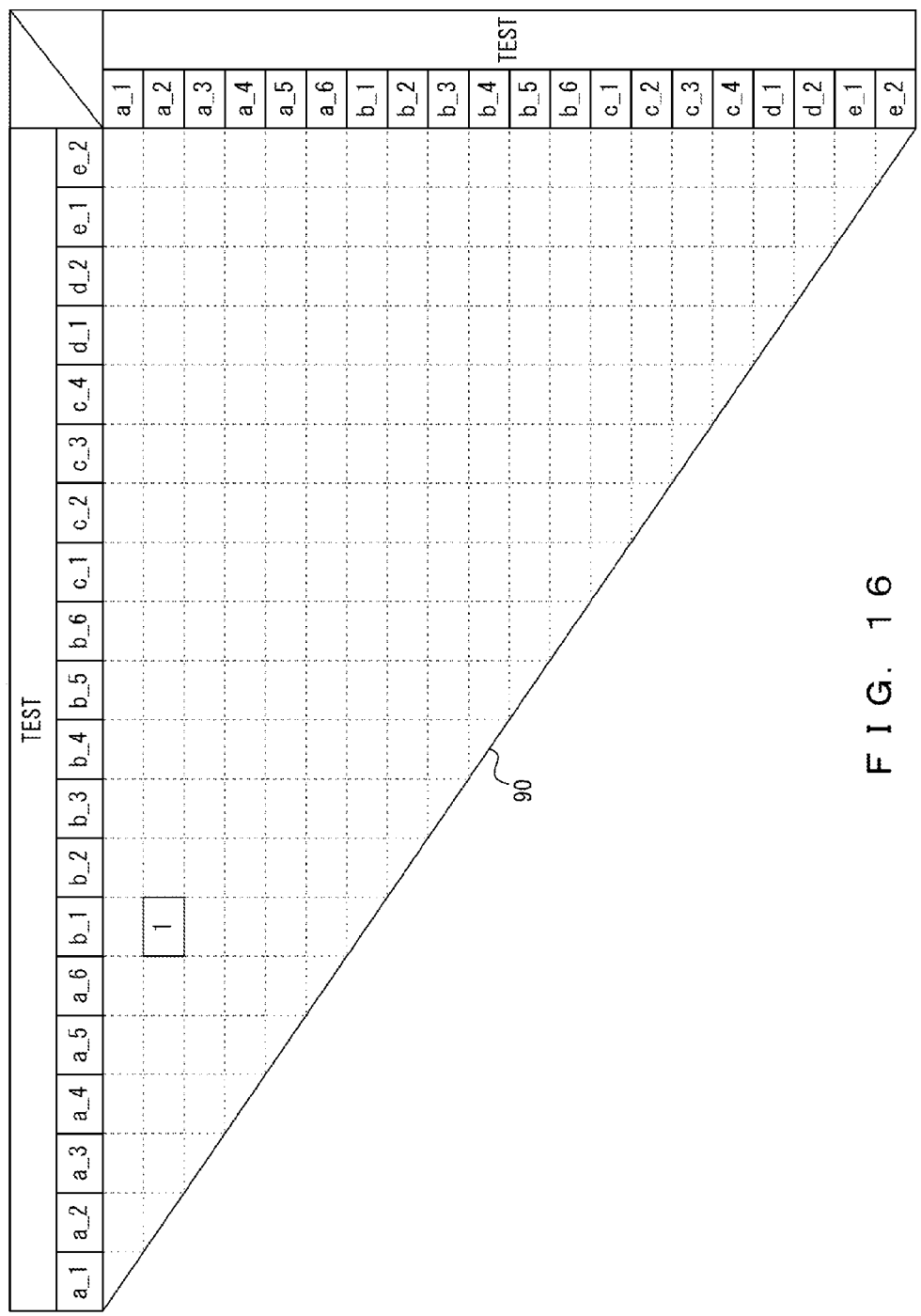
FIG. 16 illustrates an example of a co-occurrence table that indicates a co-occurrence relationship.

FIG. 16 illustrates an example of a co-occurrence table 90. In the co-occurrence table 90 of FIG. 16, a co-occurrence relationship coefficient K is stored in a matched cell of test a_2 and test b_1. This means that there is a co-occurrence relationship between the test a_2 and the test b_1 and that the value of the relationship coefficient of the co-occurrence relationship is K. Information that indicates the co-occurrence table 90 of FIG. 16 is stored in the accumulator 38 (FIG. 3), as included in table information 68. The co-occurrence relationship in the test relationship diagram 84, that is, the co-occurrence line 88 and the co-occurrence relationship coefficient K, is updated every time a test is performed.

In Step 101, a co-occurrence relationship coefficient K is not necessarily represented in the test relationship diagram 84 or in the co-occurrence table 90. In this case, the co-occurrence relationship coefficient K in the test relationship diagram 84 created in Step 101 and the co-occurrence table 90 may be stored for the first time in Step 105 and Step 115, which will be described below.

Next, in Step 102, the CPU 32 determines whether there is the information that indicates the input 1. In other words, the CPU 32 determines whether there is source information 62 that indicates source code before the target program is changed in pieces of source information 62 that are accumulated in the accumulator 38. When making a negative determination in Step 102, the CPU 32 moves on to the process of Step 109 in FIG. 9B, and when making an affirmative determination in Step 102, the CPU 32 moves on to the process of Step 103. In Step 103, the CPU 32 determines whether there is the information that indicates the input 2. In other words, the CPU 32 determines whether there is relationship diagram information 66 that indicates a test relationship diagram corresponding to the source code before the target program is changed.

When making a negative determination in Step 103, in Step 104, the CPU 32 creates a program dependence graph 74 by use of the information indicating the input 1, that is, the source code before the target program is changed, and moves on to the process of Step 106. On the other hand, when making an affirmative determination in Step 103, in Step 105, the CPU reflects a relationship coefficient (a co-occurrence relationship coefficient K that will be described in detail below) in the test relationship diagram 84 created in Step 101 by use of the test relationship diagram corresponding to the source code before the target program is changed that indicates the input 2, and moves on to the process of Step 106.

Next, in Step 106, the CPU 32 creates a changed portion list 92 (FIG. 17) after an identification of a changed portion in the target program.

In processing of identifying a changed portion, not merely a modified portion in a target program, but a function that is an example of a module that is a node 76 in the program dependence graph 74 after a change in the program is identified. In other words, the CPU 32 extracts a modified portion from each of the pieces of source information 62 before and after the target program is changed, and identifies a function that is a node 76 in the program dependence graph 74 that corresponds to the extracted modified portion. The CPU 32 creates information that indicates a function of the identified changed portion as a changed portion list 92. The information that indicates the created changed portion list 92 is stored in the accumulator 38 (FIG. 3), as included in the table information 68. The changed portion list 92 may temporarily be stored in the memory 34.

Further, in the processing of identifying a changed portion, a portion that is to be affected by the identified changed portion is also be identified. In other words, the CPU 32 identifies a portion that is to be affected by a modification of function that is the identified changed portion. In particular, it repeats extracting of, from the nodes 76 that are functions that are an identified changed portion, a function that is a dependence source of the oriented segment 78 in the program dependence graph 74 of the target program after the change. For example, when a modification has been made to the function c, the functions that are a dependence source of the oriented segment 78 in the program dependence graph 74 are extracted in order of the function b and the function a. The CPU 32 creates, as an affected portion list 94, pieces of information that indicate the functions that are an identified changed portion and the extracted functions for each changed portion. Information that indicates the created affected portion list 94 is stored in the accumulator 38 (FIG. 3), as included in table information 68. The affected portion list 94 may temporarily be stored in the memory 34.

Figure 17:
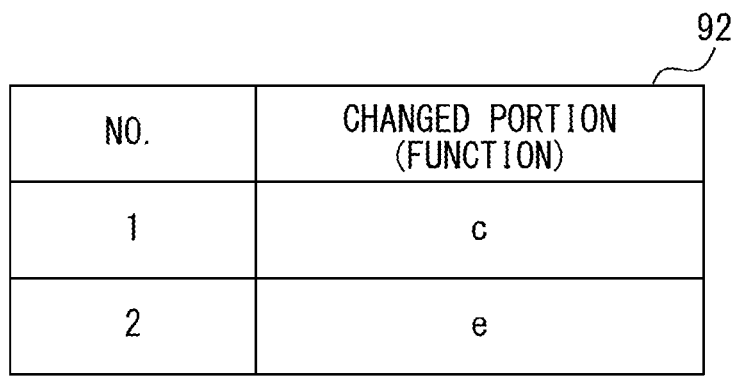
FIG. 17 illustrates an example of a changed portion list.
Figure 18:
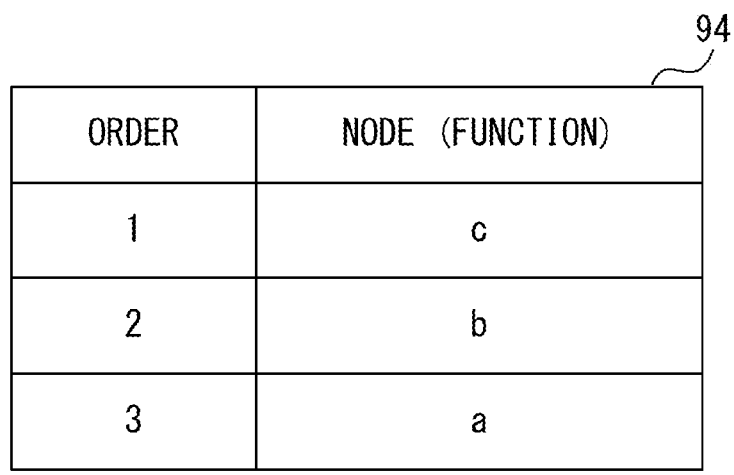
FIG. 18 illustrates an example of an affected portion list.

FIG. 17 illustrates an example of a changed portion list 92, and FIG. 18 illustrates an example of an affected portion list 94. The changed portion list 92 in FIG. 17 illustrates a case in which the functions that are an identified changed portion are the function c and the function e. The changed portion list 94 in FIG. 18 illustrates a case in which the function that is an identified changed portion is the function c, and the function b and the function a are extracted as a function to be affected by the change in the function c.

Next, in Step 107 of FIG. 9B, the CPU 32 selects one changed portion from the changed portion list 92 created in Step 106. The CPU 32 makes a selection according to the order in the changed portion list 92. Further, in Step 107, the CPU 32 acquires a test set 86 associated with the function that is a node of the selected changed portion, on the basis of the function test table 82. Next, in Step 108, the CPU 32 determines whether the test set 86 selected in Step 107 is a test set that has been already performed. When the test set 86 selected in Step 107 is a test set 86 that has been already performed, the CPU 32 makes an affirmative determination in Step 108 and returns to Step 107. If the test set 86 selected in Step 107 is the last changed portion in the changed portion list 92, when the CPU 32 makes an affirmative determination in Step 108, this processing routine can be terminated.

On the other hand, when the test set 86 selected in Step 107 is a test set 86 that has been unperformed, the CPU 32 makes a negative determination in Step 108, and moves on to the process of Step 109.

In Step 109, the CPU 32 performs the test set 86 acquired in Step 107.

Next, in Step 110, the CPU 32 determines whether the function on which the test set 86 has been performed in Step 109 has an upper-level function with which the test set 86 is associated. In other words, for the node in the program dependence graph 74 that corresponds to the function on which the test set 86 has been performed, the CPU 32 determines whether there is a hierarchically upper node, that is, a hierarchically upper-level function with which it has a dependence relationship. In particular, the CPU 32 refers to an affected portion list 94 that corresponds to the changed portion selected in Step 107, and determines whether there is an upper node (function) of the node that is being processed. When the test set 86 performed in Step 109 is at the top, the CPU 32 makes a negative determination in Step 110, and determines in Step 116 whether there is any changed portion left in the changed portion list 92 for which the test set 86 has not been performed. When test set 86 has been performed on all the changed portions registered in the changed portion list 92, the CPU 32 makes a negative determination in Step 116, and this processing routine is terminated. When there is a changed portion in the changed portion list 92 for which the test set 86 has not been performed yet, the CPU 32 makes an affirmative determination in Step 116 and returns to Step 107 so as to perform processing on the remaining changed portion.

When there is an upper-level function for the test set 86 performed in Step 109, the CPU 32 makes an affirmative determination in Step 110.

Then, in Step 111, the CPU 32 extracts, as a test to be additionally performed, the tests that have a co-occurrence relationship with the tests in which an error occurred in Step 109, on the basis of the test relationship diagram 84 (co-occurrence table 90). Then, in Step 111, the CPU 32 determines the order of performing the extracted tests, that is, the tests included in the upper-level test set 86, on the basis of the test relationship diagram 84 (co-occurrence table 90).

In Step 111, the performing order is determined on the basis of the priority of test set 86. In particular, first, using a priority determination formula that is expressed by the following formula, the CPU 32 obtains the priority TP of the tests that have a co-occurrence relationship with the test in which an error has occurred and that are included in a test set 86 for an upper-level function. The priority determination formula permits obtaining of the priority TP (test priority) of each test set 86 from a sum of weights of co-occurrence relationships (relation_value) of a lower-level test set 86. The weight of co-occurrence relationship (relation_value) is a co-occurrence relationship coefficient K. Further, a test and a lower-level test set 86 are represented as "test" and "LowerTestCase", respectively. In a test included in the lower-level test set 86 that does not have any co-occurrence relationship, a weight of co-occurrence relationship (co-occurrence relationship coefficient K) is zero. Next, the order of performing a test is determined in descending order of the obtained priorities TP, and the determined order of performing a test is determined as an order of performing a test in the upper-level test set 86.

$$TestPriority = \Sigma_{test_j \in LowerTestCase} relation\_value(test, test_j)$$

Next, in Step 112, the CPU 32 performs the tests extracted in Step 111 in the order determined in Step 111. When no error has occurred in the test set 86 performed in Step 109, the CPU 32 may perform all the tests included in the upper-level test set 86. Further, the CPU 32 may identify a test by use of the order of performing the tests that correspond to changed portions and in which an error occurred in the past, and that have a co-occurrence relationship with the test, the order of performing the tests being reflected in the test relationship diagram 84.

Next, in Step 113, the CPU 32 calculates an entropy by use of a result of performing the tests performed in Step 109 and a result of performing the tests performed in Step 112. In particular, first, the CPU 32 identifies the tests that failed in Step 109 and Step 112. Then, the CPU 32 calculates an entropy by use of the number of pairs of the tests that failed in Step 109 and the tests that failed in Step 112, and the number of pairs of the tests that were performed in Step 109 and the tests that were performed in Step 112. The formula for calculating an entropy is Formula 1 described above.

Next, in Step 114, the CPU 32 determines whether the value of the entropy calculated in Step 113 is greater than a predetermined threshold. When the entropy value is not greater than the predetermined threshold, the CPU 32 makes a negative determination in Step 114, and moves on to the process of Step 116. On the other hand, when the entropy value is greater than the predetermined threshold, the CPU 32 makes an affirmative determination in Step 114, and reflects, in Step 115, in the test relationship diagram 84 and the co-occurrence table 90, the information on the co-occurrence relationships that have occurred by performing the tests that were performed in Step 109 Step 112. In other words, the CPU 32 increments, by one, the value of the co-occurrence relationship coefficient K of the pair between which a co-occurrence relationship has occurred.

Then, the CPU 32 moves on to the process of Step 110, and the processes of Step 110 to Step 116 are repeated. However, in Step 110, the CPU 32 determines whether the function for which a test set 86 was performed in the last-time-performed process of Step 111 has an upper-level function that is associated with the test set 86. Further, in Step 111, the CPU 32 may extract, as a test to be additionally performed, the tests that have a co-occurrence relationship with the tests in which an error occurred in the previously performed processes of Step 111, on the basis of the test relationship diagram 84 (co-occurrence table 90). Further, in Step 113, the CPU 32 may calculate an entropy by use of a result of performing the tests that were performed in the last-two-times-performed processes of Step 112. Further, the CPU 32 may reflect, in Step 115, in the test relationship diagram 84 and the co-occurrence table 90, the information on the co-occurrence relationships that have occurred by performing the tests that were performed in the last-two-times-performed processes of Step 112.

There may be a plurality of upper-level functions for the test set 86 performed in Step 109 or in Step 112. In this case, in Step 111, each sum of the priorities TP of the tests included in a test set 86 that is associated with each of the plurality of functions is obtained, and the performing order can be determined, for example, in order of priority, on the basis of the obtained sums.

In particular, taking the changed portion list 92 in FIG. 17 as an example, first, the changed portion list 92 is referred to and the function c is selected as a changed portion (S107), and the test set 86c is performed (S109). When there is not any test that is included in the test set 86c with respect to the function c and in which an error has occurred, the test set 86b for the function b which is a hierarchically upper-level function and then the test set 86a for the function a are performed. On the other hand, when an error has occurred in the test set 86c with respect to the function c, the tests that have a co-occurrence relationship in the test set 86b that is a hierarchically upper-level test set are extracted (S111), and the tests are performed in order of test priority TP, that is, in order of sum of weights of co-occurrence relationships (S112).

Figure 19:
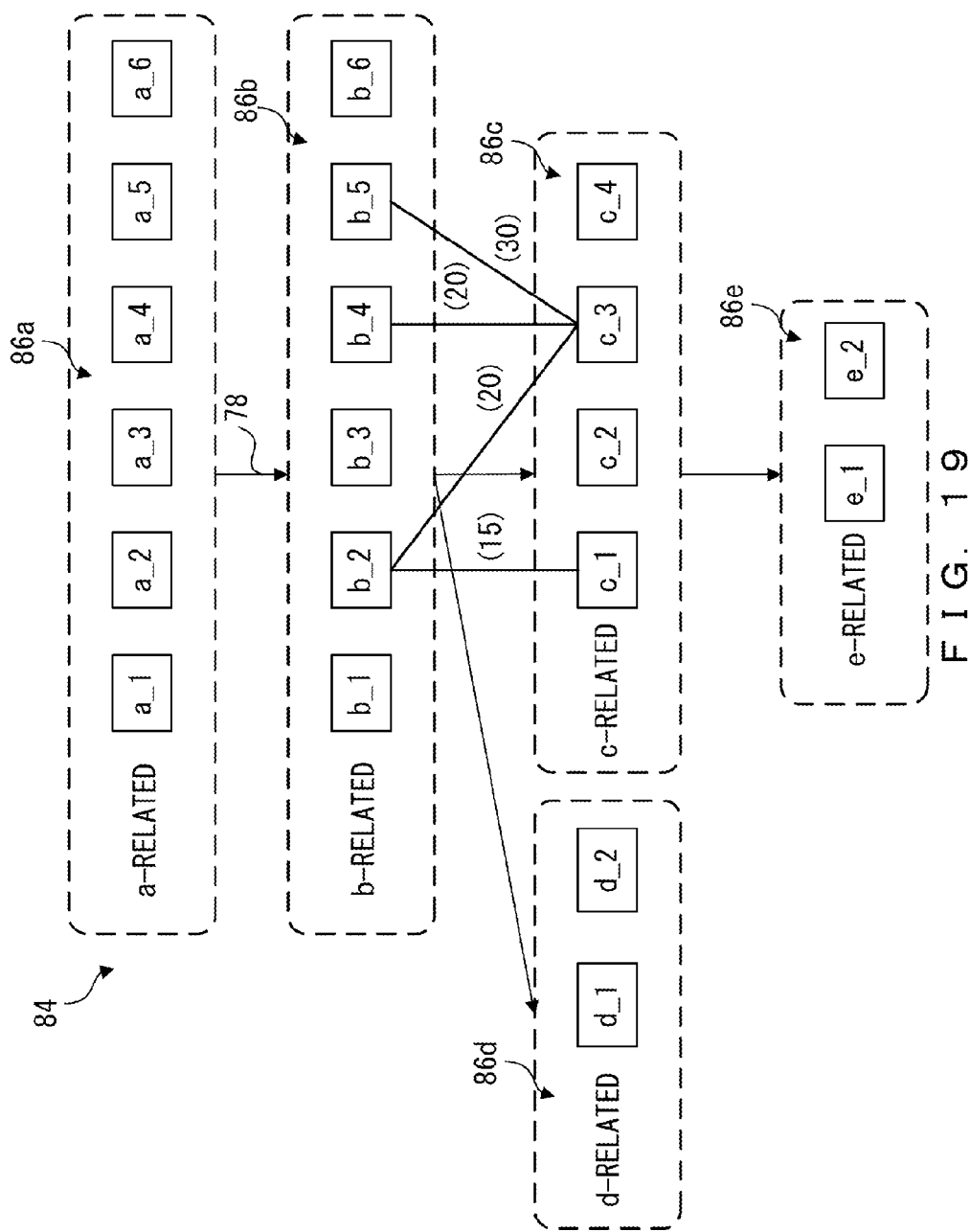
FIG. 19 is a diagram for explaining a determination of the performing order based on the priority.
Figure 20:
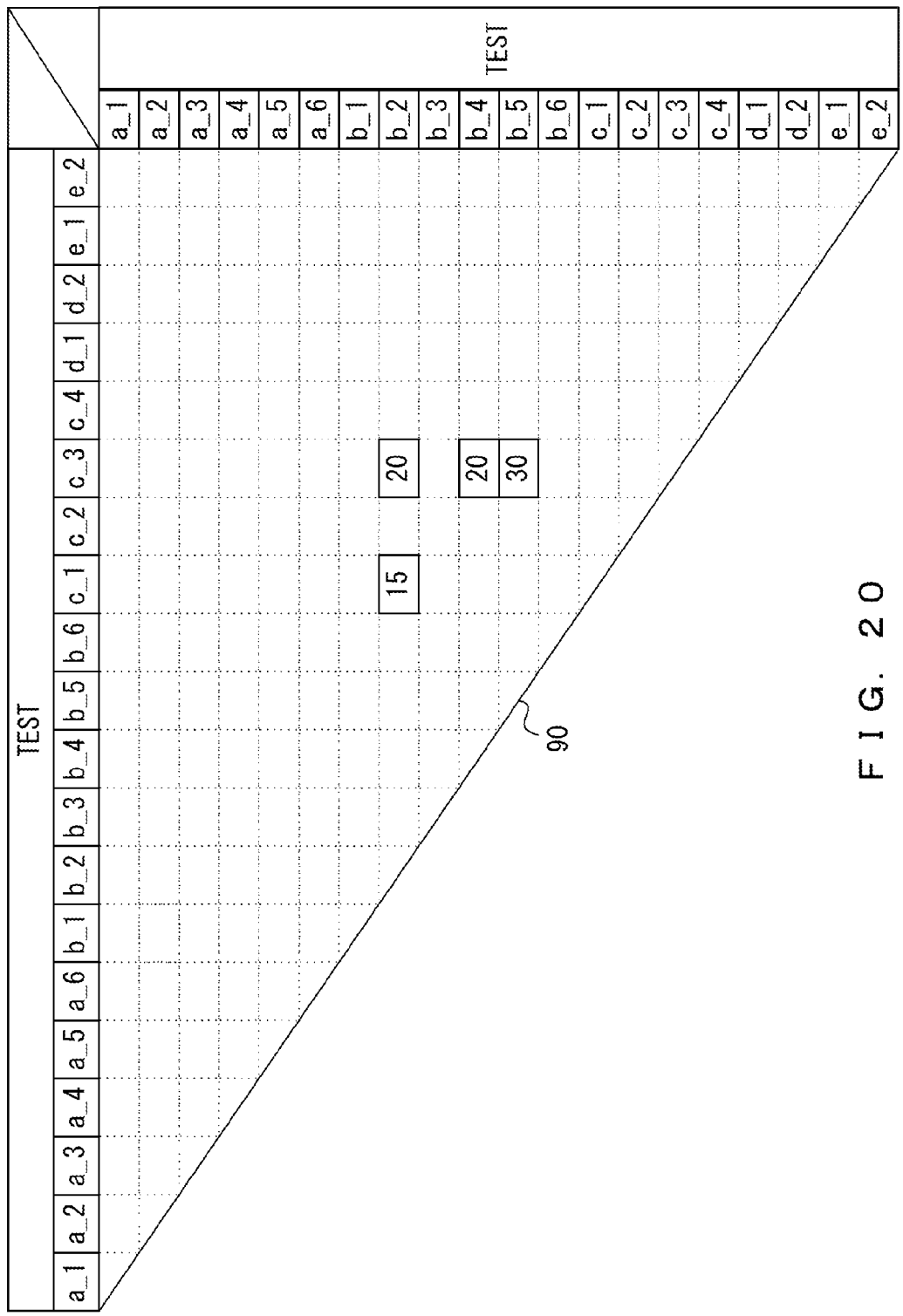
FIG. 20 illustrates an example of a co-occurrence table that indicates a co-occurrence relationship.

FIG. 19 illustrates an example of a test relationship diagram 84 for explaining a determination of the performing order based on the priority of test set 86. The example of FIG. 19 indicates a case in which an error has occurred in the test c_1 and the test c_3 as a result of performing the test set 86c for the function c after the function c is modified. Further, FIG. 20 illustrates an example of a co-occurrence table 90 that indicates a co-occurrence relationship. In FIG. 20, "15" is stored as a co-occurrence relationship coefficient K in the cell of test c_1 and test b_2 having a co-occurrence relationship Likewise, "20" is stored in the cell of test c_3 and test b_2, "20" in the cell of test c_3 and test b_4, and "30" in the cell of test c_3 and test b_5.

In the test set 86b for the function b that is an upper-level test set of the test set 86c for the function c, the test b_2, the test b_4, and the test b_5 have a co-occurrence relationship. The test b_1, the test b_3, and the test b_6 do not have a co-occurrence relationship. With respect to the priority TP that is a sum of weights of co-occurrence relationships, the test b_2=35, the test b_4=20, and the test b_5=30. Therefore, the tests to be performed in the test set 86b are the test b_2, the test b_4, and the test b_5, the order of the test b_2, the test b_5, and the test b_4 is determined, and the tests are performed in the determined order of priority.

When there is a test set that includes the tests in which an error occurs in a co-occurring manner as a result of performing a test, an entropy of the co-occurrence relationship that has occurred is calculated (S113). Then, when the calculated entropy is greater than the predetermined threshold (Yes in S114), the co-occurrence relationship coefficient K of the tests is updated (S115). For example, if the relationship is as illustrated in FIGS. 19 and 20, an entropy is "$-\log(2/24)=1.08$" when an error has occurred in the test c_1, the test c_3, and the test b_4 in a co-occurring manner. In this case, when the predetermined threshold is "0.5", the entropy value is greater than the threshold. Then, the co-occurrence relationship coefficient K of the test c_1 and the test b_4 is updated from "0" to "1", and the co-occurrence relationship coefficient K of the test c_3 and the test b_4 is updated from "20" to "21".

In the processing performed by the test program 50 described above, some of or the entirety of the processes of Step 108 and Step 112 are included in the processing performed by the performing process. Further, some of or the entirety of the process of Step 113 is included in the processing performed by the identification process and the calculation process. Furthermore, some of or the entirety of the process of Step 114 is included in the processing performed by the estimation process and the calculation process. Moreover, the process of Step 101 is included in the processing performed by the relationship-diagram creation process. Further, some of or the entirety of the process of Step 107 is included in the processing performed by the changed portion identification process. Furthermore, some of or the entirety of the process of Step 111 is included in the processing performed by the extraction process. Moreover, some of or the entirety of the processes of Step 109, Step 111, and Step 112 are included in the processing performed by the control process.

The co-occurrence relationship that is considered in the embodiments is not limited to the co-occurrence relationship that occurs between a pair of a test for a predetermined function included in a target program and a test for a function that has a co-occurrence relationship directly with the predetermined function. In other words, for example, when there is a dependence relationship between functions illustrated in FIG. 15, not only the co-occurrence relationship that occurs between the test sets 86a and 86b, but also the co-occurrence relationship that occurs between the test sets 86a and 86d may be stored in the test relationship diagram 84 and the co-occurrence table 90.

As described above, in the present embodiment, it is determined whether information on a co-occurrence relationship is to be stored in mutual relationship information 24 on the basis of the amount of information when the co-occurrence relationship occurred. When the amount of information on a co-occurrence relationship is small, not storing the information that indicates the co-occurrence relationship in the mutual relationship information 24 permits a mutual relationship between tests to be indicated with a high accuracy. Therefore, when extracting a test relating to a test that failed after a target program is changed, using such mutual relationship information 24 permits the related test to be extracted with a higher accuracy.

Further, in the present embodiment, the tests that are associated with a function that has a co-occurrence relationship with another function that has a dependence relationship with a function that corresponds to a changed portion of a target program are preferentially performed. In other words, when an error has occurred in the tests that correspond to the changed portion of the target program, a test that has a co-occurrence relationship in which a relationship between tests has been determined on the basis of the relationship between modules of the target program, is additionally identified and performed. As described above, with respect to the tests corresponding to the functions included in the program, a test to be performed can be identified by use of the accumulated mutual relationship between tests, and the content of test for the target program can be identified. Accordingly, for example, a range of performing a regression test associated with a change such as a program modification can be inhibited, and a time for processing a test can be reduced.

Further, in the present embodiment, a result of performing a test can be accumulated by storing in the accumulator 38 information that indicates a relationship between a plurality of tests.

Furthermore, in the present embodiment, a test is associated with a module including a predetermined function, so the test can be associated with program source code as classified for each function.

Moreover, in the present embodiment, if an error occurred as a result of a predetermined performance result when a specific test was performed, a mutual relationship with another test with which the specific test has a dependence relationship is accumulated. Therefore, it is possible to quickly take care of an error that occurs in a function when testing a target program.

Further, in the present embodiment, information that indicates a mutual relationship between a certain function that corresponds to a changed portion of a target program and another function with which the certain function has a dependence relationship refers to information that indicates a co-occurrence relationship whose level of mutual relationship is represented by a co-occurrence relationship coefficient K. The co-occurrence relationship coefficient K is sequentially updated when a specific test is performed and an error occurs. Therefore, for an affected portion that is dependent on a changed portion of a target program, a history of a portion in which an error is likely to occur can be accumulated, and the test that is anticipated to affect the changed portion of the target program can be performed.

Furthermore, in the present embodiment, a test set including a plurality of tests is associated with a specific function. For a dependence relationship of a function of a target program, information is used that indicates a co-occurrence relationship that is a mutual relationship between tests included in a test set with which the function is associated. Therefore, even when a plurality of tests are associated with a specific function, the test in which an error is anticipated to be likely to occur can be performed by use of the co-occurrence relationship between the tests included in the test set.

Moreover, in the present embodiment, the order of performing tests included in a test set associated with a function is determined by use of the information that indicates a co-occurrence relationship whose level of mutual relationship is represented by a co-occurrence relationship coefficient K. Therefore, the tests in which an error that is anticipated to be likely to occur can be put in order and performed.

Further, in the present embodiment, for changed portions of a target program, not a simple change in source code, but a changed portion such as a function that is a starting point having a dependence relationship with others is extracted. Therefore, a test can be performed on a function with which there is a dependence relationship, and the test can be performed in consideration of the dependence relationships of the functions of the target program.

Furthermore, in the present embodiment, a dependence relationship is obtained that indicates a performing order in a target program, the order of performing tests is set on the basis of the dependence relationship, and a test is performed on a function included in the target program. Therefore, a test can be performed that matches the content of performing the target program.

Second Embodiment

Next, a second embodiment will be described. In the second embodiment, a relationship-diagram creation unit weights the information that indicates the level of relationship for each mutual relationship according to the strength of mutual relationship calculated by a calculation unit, and stores it in mutual relation information.

Figure 21:
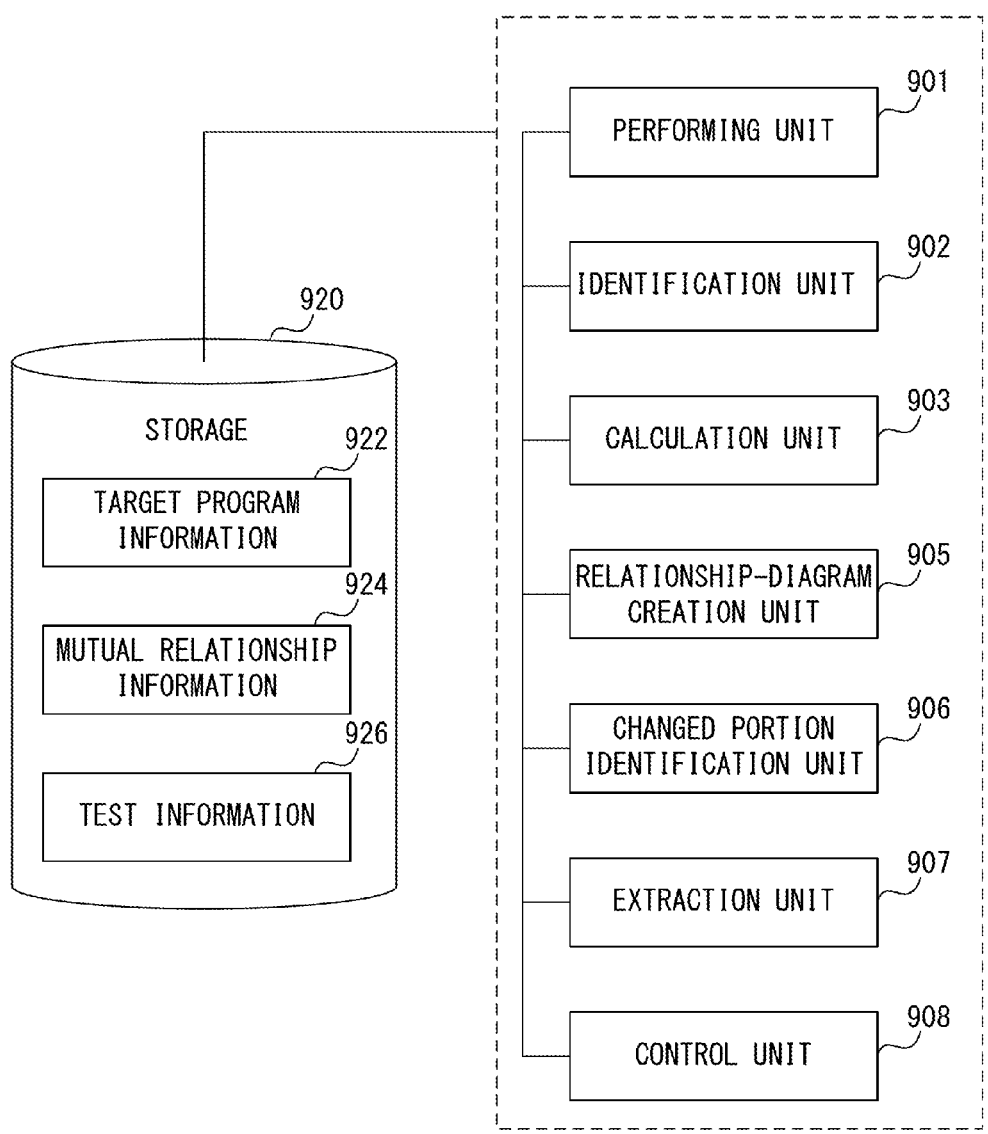
FIG. 21 illustrates an example of a test selection apparatus of a target program according to a second embodiment.

FIG. 21 illustrates an example of a test selection apparatus of a target program according to the second embodiment. A test selection apparatus 900 includes a performing unit 901, an identification unit 902, a calculation unit 903, a relationship-diagram creation unit 905, a changed portion identification unit 906, an extraction unit 907, and a control unit 908. Further, a storage 920 is connected to the test selection apparatus.

The storage 920 stores therein target program information 922, mutual relationship information 924, and test information 926. The target program information 922, the mutual relationship information 924, and the test information 926 are similar to the target program information 22, the mutual relationship information 24, and the test information 26 illustrated in FIG. 2 of the first embodiment, respectively.

The performing unit 901, the identification unit 902, the changed portion identification unit 906, the extraction unit 907, and the control unit 908 are similar to the performing unit 11, the identification unit 12, the changed portion identification unit 16, the extraction unit 17, and the control unit 18 illustrated in FIG. 2 of the first embodiment, respectively.

The calculation unit 903 calculates the strength of mutual relationship of a pair having a mutual relationship, the pair being identified by the identification unit 902. The calculation of the strength of mutual relationship is performed on the basis of the total number of all pairs of the tests for the respective modules having a dependence relationship, and on the basis of the number of pairs having a mutual relationship, the pairs being identified by the identification unit 902. In particular, the strength of mutual relationship calculated by the calculation unit 903 is, for example, an entropy value that will be described below. Then, on the basis of the calculated strength of mutual relationship, the calculation unit 903 calculates a weight to be added to information that indicates the level of relationship for the mutual relationship identified by the identification unit 902.

On the basis of information on the pairs having a mutual relationship that are identified by the identification unit 902, and on the basis of the weights calculated by the calculation unit 903, the relationship-diagram creation unit 905 creates the mutual relationship information 924 and stores it in the storage 920. In particular, for the pairs having a mutual relationship that are identified by the identification unit 902, the relationship-diagram creation unit 905 adds the weights calculated by the calculation unit 903 to the information that indicates the level of relationship for each mutual relationship, and updates the mutual relationship information 924.

The example of realizing a test selection apparatus by a computer according to the second embodiment is similar to that of FIG. 3 in the first embodiment. However, the test program 50 includes the performing process, the identification process, the calculation process, and the relationship-diagram creation process that correspond to the performing unit 901, the identification unit 902, the calculation unit 903, and the relationship-diagram creation unit 905, respectively. Further, the test program 50 includes the changed portion identification process, the extraction process, and the control process that correspond to the changed portion identification unit 906, the extraction unit 907, and the control unit 908, respectively.

In the second embodiment, the weight that is to be added to the information that indicates the level of relationship for a mutual relationship is obtained, in particular, using Formula 2 below:

Weight=entropy/the number of co-occurrence relationships that occurred during a test (Formula 2)

Figure 22A:
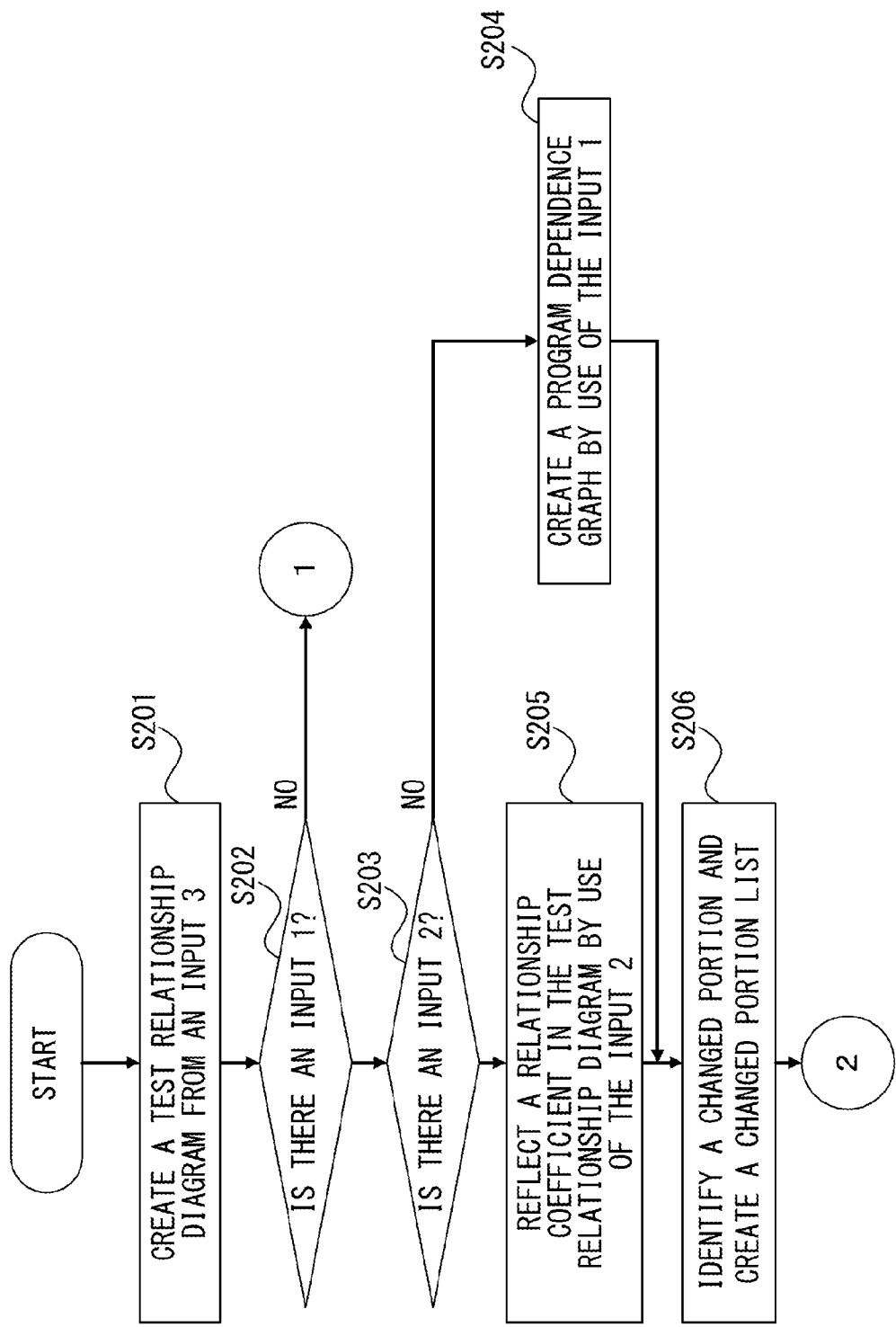
FIG. 22A is a flowchart (1) that illustrates an example of a flow of test processing in the test selection apparatus according to the second embodiment.
Figure 22B:
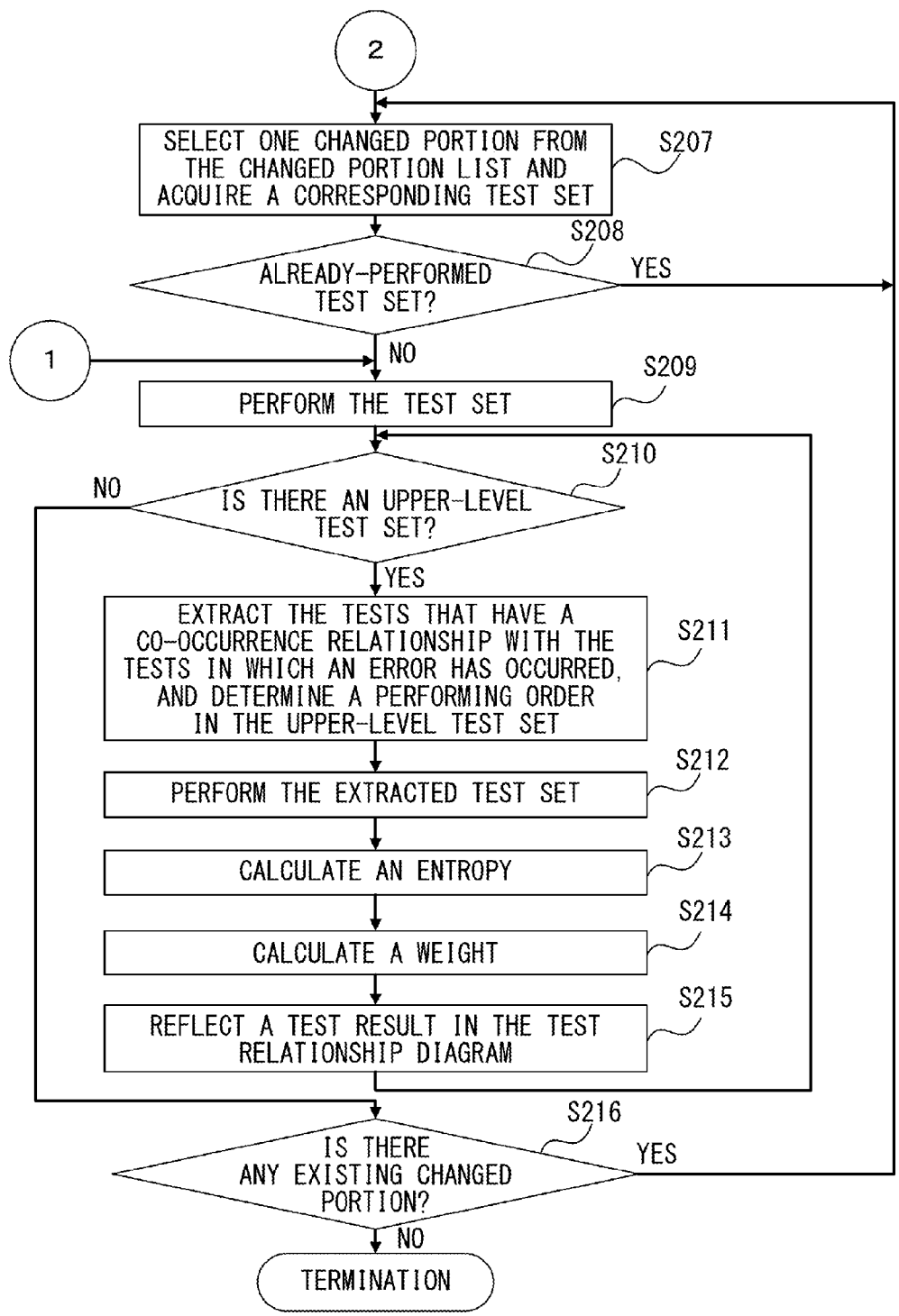
FIG. 22B is a flowchart (2) that illustrates an example of a flow of test processing in the test selection apparatus according to the second embodiment.

Next, a flow of a test for a target program in the test selection apparatus according to the second embodiment will now be described. FIG. 22A is a flowchart (1) that illustrates an example of a flow of test processing in the test selection apparatus according to the second embodiment. FIG. 22B is a flowchart (2) that illustrates an example of a flow of test processing in the test selection apparatus according to the second embodiment. The test flow illustrated in FIGS. 22A and 22B is processing performed by a test program that is executed as an example of the test program of the disclosed technology.

In FIGS. 22A and 22B, the processes of Step 201 to Step 213 and of Step 216 are similar to the processes of Step 101 to Step 113 and of Step 116 illustrated in FIGS. 9A and 9B according to the first embodiment.

In Step 214 of FIG. 22B, the CPU 32 calculates a weight to be added to a co-occurrence relationship coefficient K, on the basis of the value of the entropy calculated in Step 213.

Next, in Step 215, the CPU 32 weights, by use of the weight calculated in Step 214, the information on the co-occurrence relationship that has occurred as a result of performing the tests performed in Step 209 and Step 212, and reflects it in the test relationship diagram 84 and the co-occurrence table 90. In other words, in the test relationship diagram 84 and the co-occurrence table 90, the CPU 32 adds the value of the weight calculated in Step 214 to the values of the co-occurrence relationship coefficients K of the pairs in which a co-occurrence relationship has occurred. Then, the CPU 32 moves on to the process of S210.

Figure 23:
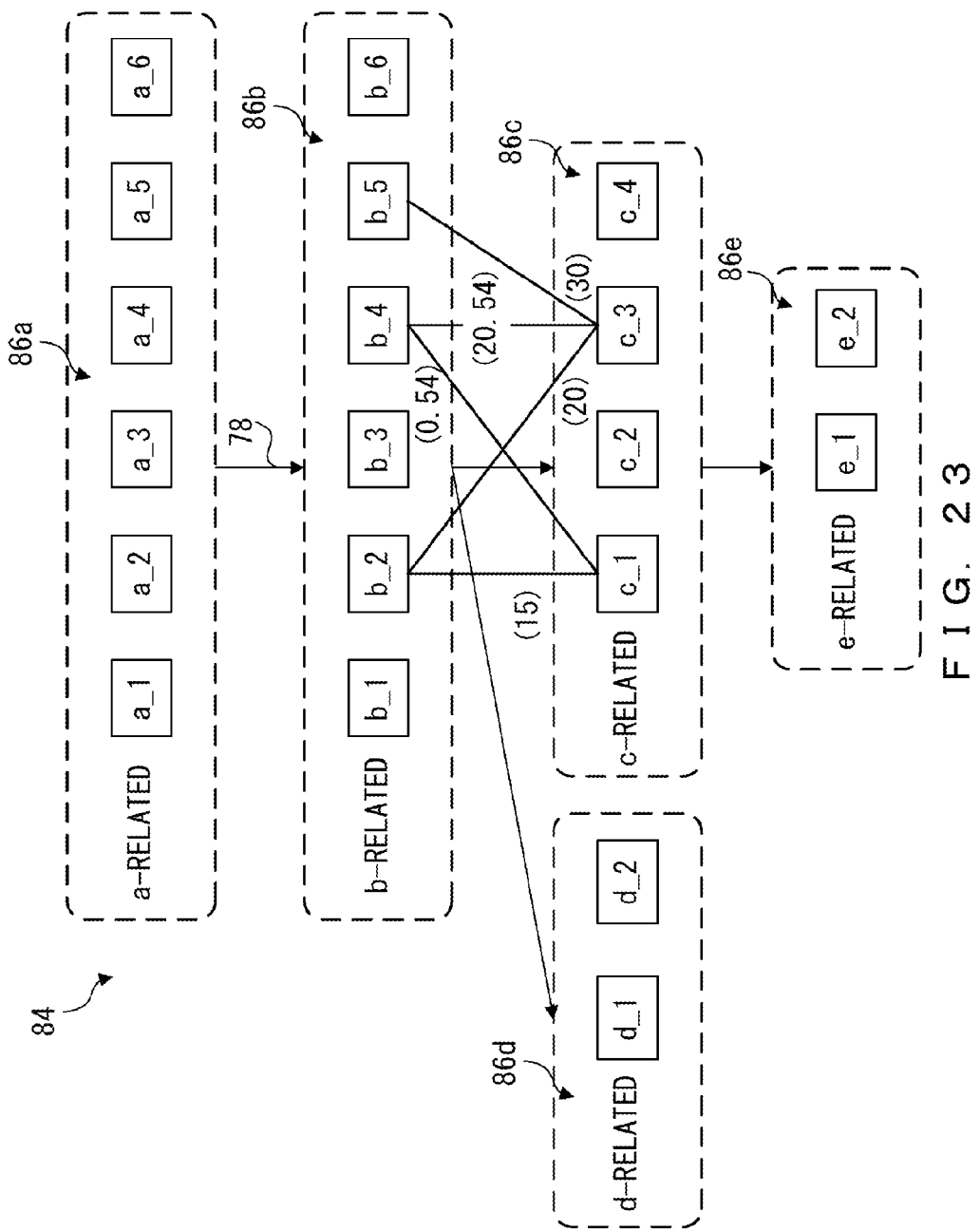
FIG. 23 is a diagram that illustrates updating of co-occurrence relationship coefficient K in the second embodiment.

FIG. 23 is a diagram that illustrates updating of co-occurrence relationship coefficient K in the second embodiment. The example of FIG. 23 illustrates a state of the test relationship diagram 84 after the information that indicates the co-occurrence relationship between the test c_1, the test c_3, and the test b_4 when an error has occurred in those tests in a co-occurring manner is updated from the state of the test relationship diagram 84 of FIG. 19. When an error has occurred in the test c_1, the test c_3, and the test b_4 in a co-occurring manner, the CPU 32 calculates "−log(2/24)=1.08" as an entropy value (S213). Next, the CPU 32 calculates "1.08/2=0.54" as a weight value (S214). Then, in the test relationship diagram 84, the CPU 32 updates the co-occurrence relationship coefficient K of the test c_1 and the test b_4 from "0" to "0.54", and that of the test c_3 and the test b_4 from "20" to "20.54".

In the second embodiment, a co-occurrence relationship coefficient is weighted on the basis of the amount of information of the co-occurrence relationship and is stored in the mutual relationship information 924. This permits the mutual relationship information 924 to represent the level of co-occurrence relationship between test cases with a high accuracy. Therefore, when extracting a test relating to a test that failed after a target program is changed, using such mutual relationship information 924 permits the related test to be extracted with a higher accuracy. Further, the order of processing the extracted related tests can be determined with a high accuracy on the basis of the level of relationship.

Third Embodiment

Next, a third embodiment will be described. In the first and second embodiments, the test selection apparatus 10 is realized by the computer 30, but the third embodiment provides an example of realizing the test selection apparatus 10, 900 by a plurality of computers. The third embodiment has a similar configuration to the first embodiment, so like reference numerals designate identical parts to omit a detailed description.

Figure 24:
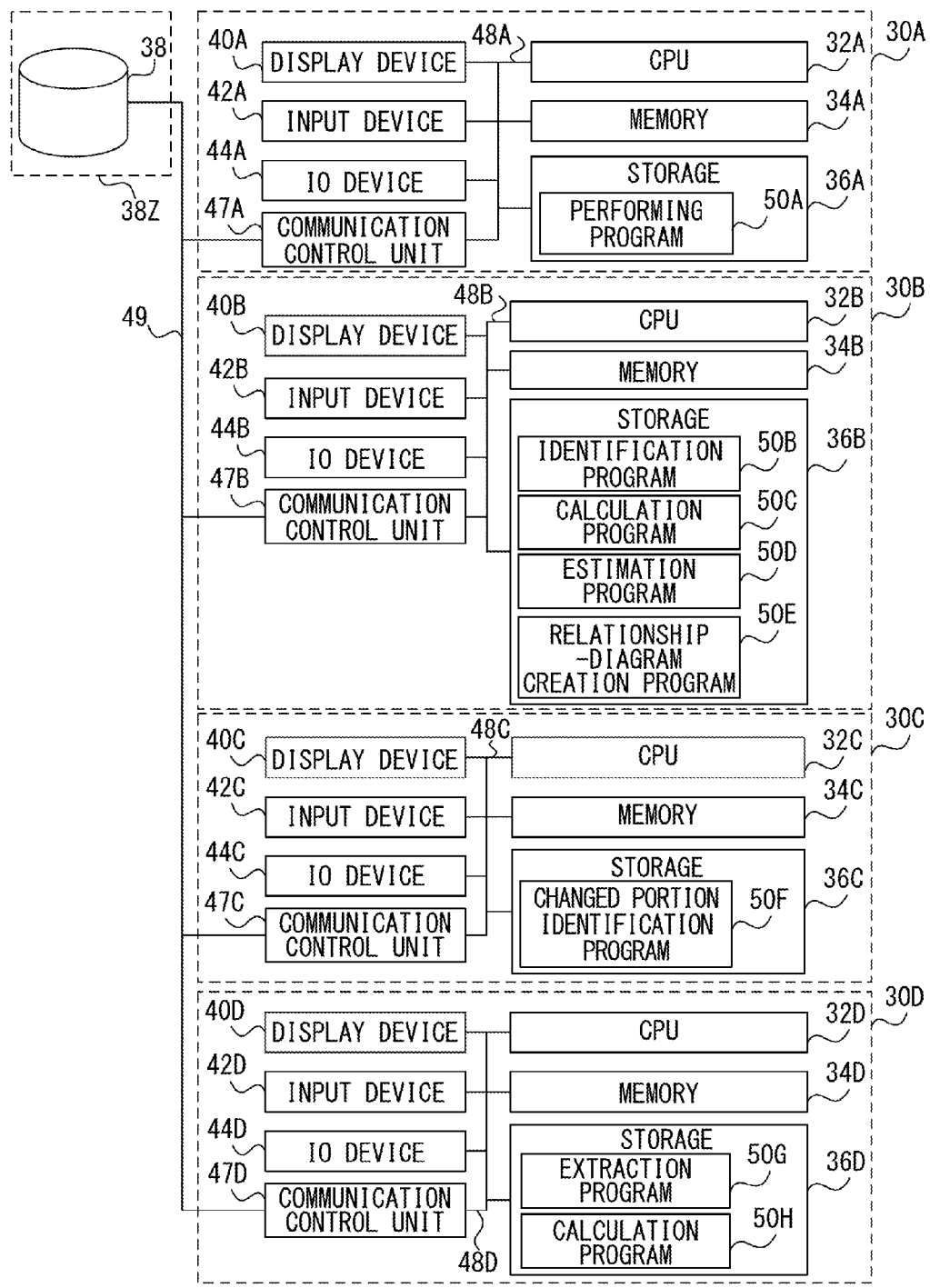
FIG. 24 is a block diagram that illustrates an example of a test selection apparatus realized by a computer system.

FIG. 24 is a block diagram that illustrates an example of realizing the test selection apparatus 10 by a computer system 11 including a plurality of computers 30A to 30D. Like the computer 30, each of the plurality of computers 30A to 30D respectively includes a CPU 32A to 32D, a memory 34A to 34D, and a storage 36A to 36D. Each of the CPUs 32A to 32D, each of the memories 34A to 34D, and each of the storages 36A to 36D are respectively connected to one another via a bus 48A to 48D. Further, each of the computers 30A to 30D respectively includes a display device 40A to 40D such as a display, and an input device 42A to 42D, and each of the display devices 40A to 40D and each of the input devices 42A to 42D are each respectively connected to each of the buses 48A to 48D. Furthermore, an IO device 44A to 44D of each of the computers 30A to 30D is respectively connected to each of the buses 48A to 48D. Moreover, each of the computers 30A to 30D respectively has a communication control unit 47A to 47D that is an interface for connecting to a computer network 49. Further, an accumulation device 38Z including an accumulator 38 is connected to the computer network 49.

In the computer system 11 illustrated in FIG. 24, the processes included in the test program of FIG. 3 are performed as stored in the different computers 30A to 30D. The combinations of the processes for storing in the computers 30A to 30D are not limited to those illustrated in FIG. 24, but any combination may be acceptable. Further, in the computer system. 11 according to the present embodiment, data or commands are transmitted and received between the computers 30A to 30D via the communication control units 47A to 47D, respectively, and via the computer network 49.

As described above, according to the third embodiment, an apparatus for testing a target program can be divided for each function for testing, which provides the advantage of distributing processing loads when testing the target program in addition to the advantage provided in the first embodiment. Further, a computer for each of the divided functions can be set to be movable, which also permits increasing of the freedom in location for installing the apparatus.

An example of realizing the test selection apparatus 10 by the computer 30 has been described above. However, it is not limited to these configurations, and various modifications and alterations may be made without departing from the scope of the above description.

Further, an aspect in which the program is stored in advance (installed) in the storage 20 has been described above, but it is not limited to this. For example, the program according to the disclosed technology can also be provided in a form in which it is recorded in a recording medium such as a CD-ROM and a DVD-ROM.

All publications, patent applications, and technical standards described in the present specification are incorporated herein by reference to the same extent as if each publication, patent application, or technical standard was specifically and individually indicated to be incorporated by reference.

The data selection device according to the embodiments permits improving of an accuracy of extracting a test relating to a designated test, from among a plurality of tests for a target program.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a selecting program that causes a computer to execute a process, the process comprising:

first generating first information that indicates whether there is a relationship between each pair of one of a plurality of first tests and one of a plurality of second tests, by use of a result of each of the plurality of first tests being performed on a corresponding one of a plurality of first modules that configure a program, each of the plurality of second tests being performed on a corresponding one of a plurality of second modules which configure the program and each of which has dependence relationship with at least one of the plurality of first modules;

second generating second information that indicates a level of the relationship of each pair having the relationship from among a plurality of the pairs, by use of a result of performing the plurality of first tests and a result of performing the plurality of second tests, the level of the relationship being obtained by comparing a strength of the relationship of each pair having the relationship from among the plurality of the pairs and a predetermined threshold, wherein the strength of the relationship being an entropy value which is calculated by using a total number of the plurality of the pairs and a total number of pairs having the relationship from among the plurality of the pairs;

when a specific test included in the plurality of first tests is designated, extracting, from among the plurality of second tests, a related test that relates to the specific test, based on the first information and the second information; and executing the specific test and the extracted related test so as to exclude execution of the plurality of remaining second tests and to maximize an effect of a test performed within a limited time.

2. The non-transitory computer-readable recording medium according to claim 1, wherein when the specific test has been designated, information on a level of relationship of a pair of the specific test and the related test is extracted along with the related test based on the second information.

3. The non-transitory computer-readable recording medium according to claim 2, the process further comprising, when the extracted related test is one of a plurality of related tests extracted from the plurality of second tests and when an instruction has been issued to perform the specific test included in the plurality of first tests, determining an order of performing the plurality of extracted related tests based on the extracted information on the level of relationship of the pair of the specific test and each of the plurality of extracted related tests.

4. The non-transitory computer-readable recording medium according to claim 2, the process further comprising:
when a specific module included in the plurality of first modules has been changed, generating the first information and the second information after the change, based on a result of performing the plurality of first tests for the specific module after the change, and based on a result of performing the extracted related test relating to each of the plurality of first tests, from among the plurality of second tests for a module having a dependence relationship with the specific module among the plurality of second modules after the change; and
updating the second information based on the number of pairs having the relationships from among the plurality of pairs after the change and the total number of pairs of one of the first tests and one of the second tests.

5. The non-transitory computer-readable recording medium according to claim 1, wherein
when both results of performing the paired first and second tests indicate an error, the first information indicates that the pair has a relationship.

6. A test selection method comprising:
first generating, by a computer, first information that indicates whether there is a relationship between each pair of one of a plurality of first tests and one of a plurality of second tests, by use of a result of each of the plurality of first tests being performed on a corresponding one of a plurality of first modules that configure a program, each of the plurality of second tests being performed on a corresponding one of a plurality of second modules which configure the program and each of which has a dependence relationship with at least one of the plurality of first modules;
second generating second information that indicates a level of the relationship of each pair having the relationship from among a plurality of the pairs, by use of a result of performing the plurality of first tests and a result of performing the plurality of second tests, the level of the relationship being obtained by comparing a strength of the relationship of each pair having the relationship from among the plurality of the pairs and a predetermined threshold, wherein the strength of the relationship being an entropy value which is calculated by using a total number of the plurality of the pairs and a total number of pairs having the relationship from among the plurality of the pairs;
when a specific test included in the plurality of first tests is designated, extracting, by the computer, from among the plurality of second tests, a related test that relates to the specific test, based on the first information and the second information; and
executing the specific test and the extracted related test so as to exclude execution of the plurality of remaining second tests and to maximize an effect of a test performed within a limited time.

7. A test selection apparatus including a processor that executes a process comprising:
first generating first information that indicates whether there is a relationship between each pair of one of a plurality of first tests and one of a plurality of second tests, by use of a result of each of the plurality of first tests being performed on a corresponding one of a plurality of first modules that configure a program, each of the plurality of second tests being performed on a corresponding one of a plurality of second modules which configure the program and each of which has a dependence relationship with at least one of the plurality of first modules;
second generating second information that indicates a level of the relationship of each pair having the relationship from among a plurality of the pairs, by use of a result of performing the plurality of first tests and a result of performing the plurality of second tests, the level of the relationship being obtained by comparing a strength of the relationship of each pair having the relationship from among the plurality of the pairs and a predetermined threshold, wherein the strength of the relationship being an entropy value which is calculated by using a total number of the plurality of the pairs and a total number of pairs having the relationship from among the plurality of the pairs;
when a specific test included in the plurality of first tests is designated, extracting, from among the plurality of second tests, a related test that relates to the specific test, based on the first information and the second information; and
executing the specific test and the extracted related test so as to exclude execution of the plurality of remaining second tests and to maximize an effect of a test performed within a limited time.

* * * * *